(12) United States Patent
Iijima et al.

(10) Patent No.: US 12,542,656 B2
(45) Date of Patent: Feb. 3, 2026

(54) AUTHENTICATION APPARATUS AND IMAGE-FORMING APPARATUS

(71) Applicant: CANON KABUSHIKI KAISHA, Tokyo (JP)

(72) Inventors: Ichiro Iijima, Kanagawa (JP); Kenjiro Hori, Saitama (JP); Hisashi Enomoto, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 72 days.

(21) Appl. No.: 18/676,116

(22) Filed: May 28, 2024

(65) Prior Publication Data

US 2024/0405974 A1 Dec. 5, 2024

(30) Foreign Application Priority Data

May 31, 2023 (JP) ................................ 2023-090207

(51) Int. Cl.
*H04L 9/08* (2006.01)
*H04L 9/32* (2006.01)

(52) U.S. Cl.
CPC .......... *H04L 9/0825* (2013.01); *H04L 9/3236* (2013.01); *H04L 9/3247* (2013.01); *H04L 9/3271* (2013.01)

(58) Field of Classification Search
CPC ... H04L 9/0825; H04L 9/3236; H04L 9/3247; H04L 9/3271; G06F 21/44; G06F 21/602
See application file for complete search history.

(56) References Cited

U.S. PATENT DOCUMENTS

2010/0250950 A1* 9/2010 Tsujimoto ........... H04L 63/0823
713/181
2010/0306545 A1* 12/2010 Seki .................... H04L 63/0823
709/206

(Continued)

FOREIGN PATENT DOCUMENTS

JP 2008259183 A 10/2008
JP 2018046575 A 3/2018

(Continued)

*Primary Examiner* — Abu S Sholeman
(74) *Attorney, Agent, or Firm* — Canon U.S.A., Inc. IP Division

(57) ABSTRACT

An authentication apparatus is provided and performs authentication on an authentication target apparatus that includes first allowance data used to determine whether a response to an authentication request from the authentication apparatus is allowed. The authentication apparatus includes timer circuitry measuring a time for which the authentication apparatus is energized; a memory storing restriction data that becomes readable after the measured time reaches a pre-set reference time; communication circuitry transmitting, to the authentication target apparatus, second allowance data that is based on the restriction data read from the memory and subjected to verification by the authentication target apparatus using the first allowance data; and processing circuitry authenticating the authentication target apparatus based on an authentication response from the authentication target apparatus when the verification performed on the second allowance data using the first allowance data is successful.

13 Claims, 17 Drawing Sheets

(56) References Cited

U.S. PATENT DOCUMENTS

| | | | | |
|---|---|---|---|---|
| 2011/0016308 A1* | 1/2011 | Eastman | ............... | H04L 9/0825 |
| | | | | 713/153 |
| 2011/0040978 A1* | 2/2011 | Tsao | ................... | H04L 63/0428 |
| | | | | 713/181 |
| 2011/0238764 A1* | 9/2011 | Shibata | .............. | H04N 1/32678 |
| | | | | 709/206 |
| 2018/0260170 A1* | 9/2018 | Dupré | ................... | G06F 3/1263 |
| 2020/0134617 A1* | 4/2020 | Barnett | ................ | G06Q 20/385 |
| 2021/0402809 A1* | 12/2021 | Ito | ........................ | B41J 2/16585 |
| 2022/0398052 A1* | 12/2022 | Jayakumar | ............ | G06F 3/1285 |
| 2023/0231960 A1* | 7/2023 | Mohan | .................. | G06F 3/1222 |
| | | | | 358/1.12 |
| 2024/0054206 A1* | 2/2024 | Belgarric | ............... | G06F 21/64 |
| 2024/0078063 A1* | 3/2024 | Tanaka | .................. | G06F 3/1222 |

FOREIGN PATENT DOCUMENTS

| | | |
|---|---|---|
| JP | 2020167671 A | 10/2020 |
| JP | 2022175066 A | 11/2022 |

\* cited by examiner

AUTHENTICATION APPARATUS AND IMAGE-FORMING APPARATUS

BACKGROUND

Technical Field

The present disclosure relates to an authentication apparatus and an image-forming apparatus.

Description of the Related Art

Conventionally, many electronic devices that are used with exchangeable components connected thereto are known. For example, image-forming apparatuses may operate together with various exchangeable components such as cartridges containing toner or ink, process cartridges, conveyance rollers, or fixing units. If an exchangeable component not envisioned in the design stage is connected to an electronic device, a problem such as failure, malfunction, or deterioration of output quality may occur in the electronic device. In view of this, some electronic devices have an authentication mechanism for determining whether or not an exchangeable component connected to the device is a genuine component.

Japanese Patent Laid-Open No. 2020-167671 discloses an example of an authentication method by which a printer (authentication apparatus) performs authentication on an exchangeable consumable item (authentication target apparatus) such as a toner cartridge. In the authentication method disclosed in Japanese Patent Laid-Open No. 2020-167671, password authentication is performed using a different password for each authentication apparatus, and a challenge-response type of main authentication session is started only if the password authentication is successful. This therefore mitigates the risk of the authentication key used in main authentication being read by a malicious third party. Also, a derived value of a password derived from a master password is used for password authentication, and thus the master password is not exposed outside the device. A genuine authentication target apparatus has a non-volatile memory storing all candidate values of secret information for deriving a derived value for verification, and thus operates effectively regardless of which authentication apparatus it is connected to.

In the authentication method disclosed in Japanese Patent Laid-Open No. 2020-167671, in order to enhance resistance against an information analysis type of attack such as microprobing, it is necessary to increase the number of variations of the secret information implemented in the product. If there are M variations of secret information used in a certain product group, the number of products required to learn the M values can be determined using the concept of the so-called coupon collector problem. For example, if M=10, it is statistically likely that all 10 variations of the secret information can be learned by acquiring 30 products. On the other hand, increasing the number of variations of secret information leads to an increase in the scale of non-volatile memory needed in the apparatus, which raises the cost.

SUMMARY

In view of the above points, the present disclosure aims to provide an authentication method that enhances resistance to an information analysis type of attack while also suppressing a rise in cost.

According to an aspect, there is provided an authentication apparatus that performs authentication on an authentication target apparatus that includes pre-stored first allowance data used to determine whether a response to an authentication request received from the authentication apparatus is allowed. The authentication apparatus includes: timer circuitry configured to measure a time for which the authentication apparatus is energized; a memory storing restriction data that becomes readable after the time measured by the timer circuitry reaches a pre-set reference time; communication circuitry configured to transmit, to the authentication target apparatus, second allowance data based on the restriction data read from the memory, the second allowance data being subjected to verification by the authentication target apparatus using the first allowance data; and processing circuitry configured to perform authentication on the authentication target apparatus based on an authentication response received from the authentication target apparatus when the verification performed on the second allowance data by the authentication target apparatus with use of the first allowance data is successful.

Further features of the present disclosure will become apparent from the following description of exemplary examples (with reference to the attached drawings).

DESCRIPTION OF THE EMBODIMENTS

Figure 1:
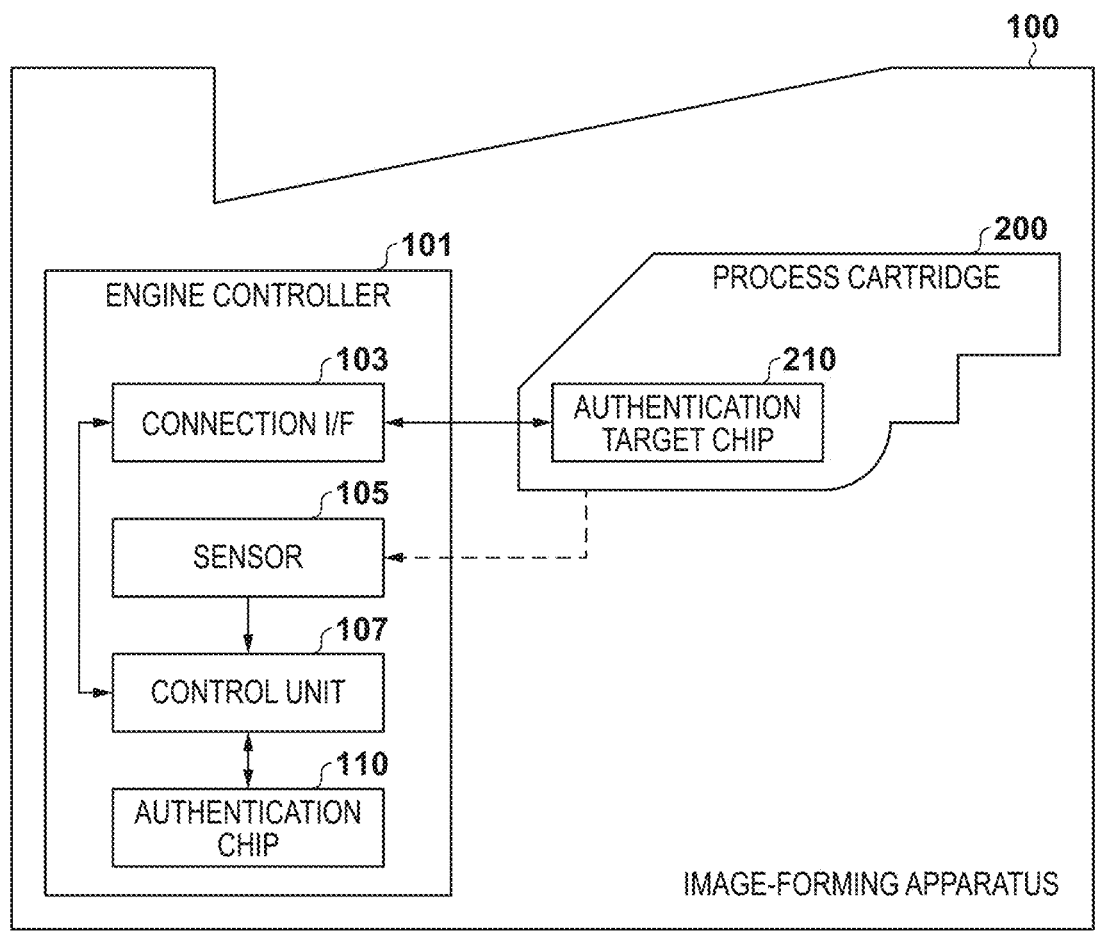
FIG. 1 is a block diagram showing how a process cartridge is connected to an image-forming apparatus in an embodiment.

Hereinafter, embodiments will be described in detail with reference to the attached drawings. Note, the following embodiments are not intended to limit the scope of the claimed disclosure. Multiple features are described in the embodiments, but limitation is not made to a disclosure that requires all such features, and multiple such features may be combined as appropriate. Furthermore, in the attached drawings, the same reference numerals are given to the same or similar configurations, and redundant description thereof is omitted.

1. Basic Configuration

In the embodiment described below, assume that an authentication chip provided in an image-forming apparatus performs authentication on a process cartridge connected to the image-forming apparatus. Therefore, the image-forming apparatus will sometimes be referred to as an authentication apparatus, the process cartridge will sometimes be referred to as an authentication target apparatus, and both will sometimes be collectively referred to as an authentication system. A process cartridge is an example of an exchangeable component for an image-forming apparatus. However, the technology according to the present disclosure is not limited to a combination of an image-forming apparatus and a process cartridge, and can be applied to various combinations of electronic devices and exchangeable components.

FIG. 1 shows how a process cartridge 200 is connected to an image-forming apparatus 100. The image-forming apparatus 100 may be a printer, a copier, or a multifunction peripheral, for example, and forms an image on a sheet using an electrophotographic process. The process cartridge 200 is an exchangeable component involved in the electrophotographic process. For example, a user can open a cover (not shown) disposed on the housing of the image-forming apparatus 100 and mount/detach the process cartridge 200 to/from the image-forming apparatus 100. The process cartridge 200 includes a photosensitive body and one or more members for forming a toner image on the surface of the photosensitive body, for example. The image-forming apparatus 100 includes an engine controller 101. The engine controller 101 performs overall control of operation of an image-forming unit (not shown) of the image-forming apparatus 100 for forming an image on a sheet by, for example, conveying the sheet, forming a toner image, transferring the toner image onto the sheet, and fixing the toner image on the sheet.

If a non-genuine process cartridge is connected to the image-forming apparatus 100, risks such as device failure, malfunction, and deterioration in print quality may arise. In view of this, the image-forming apparatus 100 has an authentication mechanism for determining whether or not the process cartridge mounted in the apparatus is a genuine product. As components related to the authentication mechanism, the engine controller 101 includes a connection interface (I/F) 103, a sensor 105, a control unit 107, and an authentication chip 110. The process cartridge 200 includes an authentication target chip 210. Typically, the authentication chip 110 and the authentication target chip 210 are tamper-resistant.

The connection I/F 103 is communicably connected to the authentication target chip 210. The connection between the connection I/F 103 and the authentication target chip 210 may be a wired connection established via an electrical contact, or a wireless connection established via an antenna. The sensor 105 is a detection unit for detecting whether or not a process cartridge is mounted to the image-forming apparatus 100. The control unit 107 is a controller that performs overall control of operation of the image-forming apparatus 100. The authentication chip 110 is an integrated circuit (IC) chip that has a function of authenticating whether the process cartridge 200 is a genuine product based on authentication data received from the authentication target chip 210 via the connection I/F 103. The authentication target chip 210 is an IC chip having a built-in memory in which authentication data for the process cartridge 200 is stored in advance.

In the present embodiment, the authentication target chip 210 stores, pre-set first allowance data used to determine whether a response to an authentication request received from an authentication chip 110 is allowed or not. Meanwhile, the authentication chip 110 stores, in advance, restriction data that serves as the basis for deriving second allowance data that is verified using the first allowance data by the authentication target chip 210. Reading of the restriction data from the memory of the authentication target chip 210 is made possible after the time for which the authentication chip 110 has been energized reaches a pre-set reference time. When the sensor 105 detects that the process cartridge 200 is mounted to the image-forming apparatus 100, the control unit 107 starts authentication processing. In the authentication processing, the authentication chip 110 reads the restriction data from the memory and transmits the second allowance data to the authentication target chip 210 only in the case where the energized time of the authentication chip 110 has reached the reference time. Then, in the case where the verification of the second allowance data using the first allowance data in the authentication target chip 210 has been successful, the authentication chip 110 performs authentication on the authentication target chip 210 using a challenge-response type of authentication method.

In this way, by not transmitting the second allowance data to the authentication target chip 210 until the energized time of the authentication chip 110 reaches the reference time (also called a time threshold value), the time required for an attacker to analyze the product becomes longer. Before the energized time reaches the reference time, the image-forming apparatus 100 may be allowed to use the process cartridge 200 without authentication, or such usage may be restricted in some sort of way. In the next section, several examples of such authentication method will be described in detail.

2. First Example 2-1. Configuration Example of Authentication Chip

Figure 2:
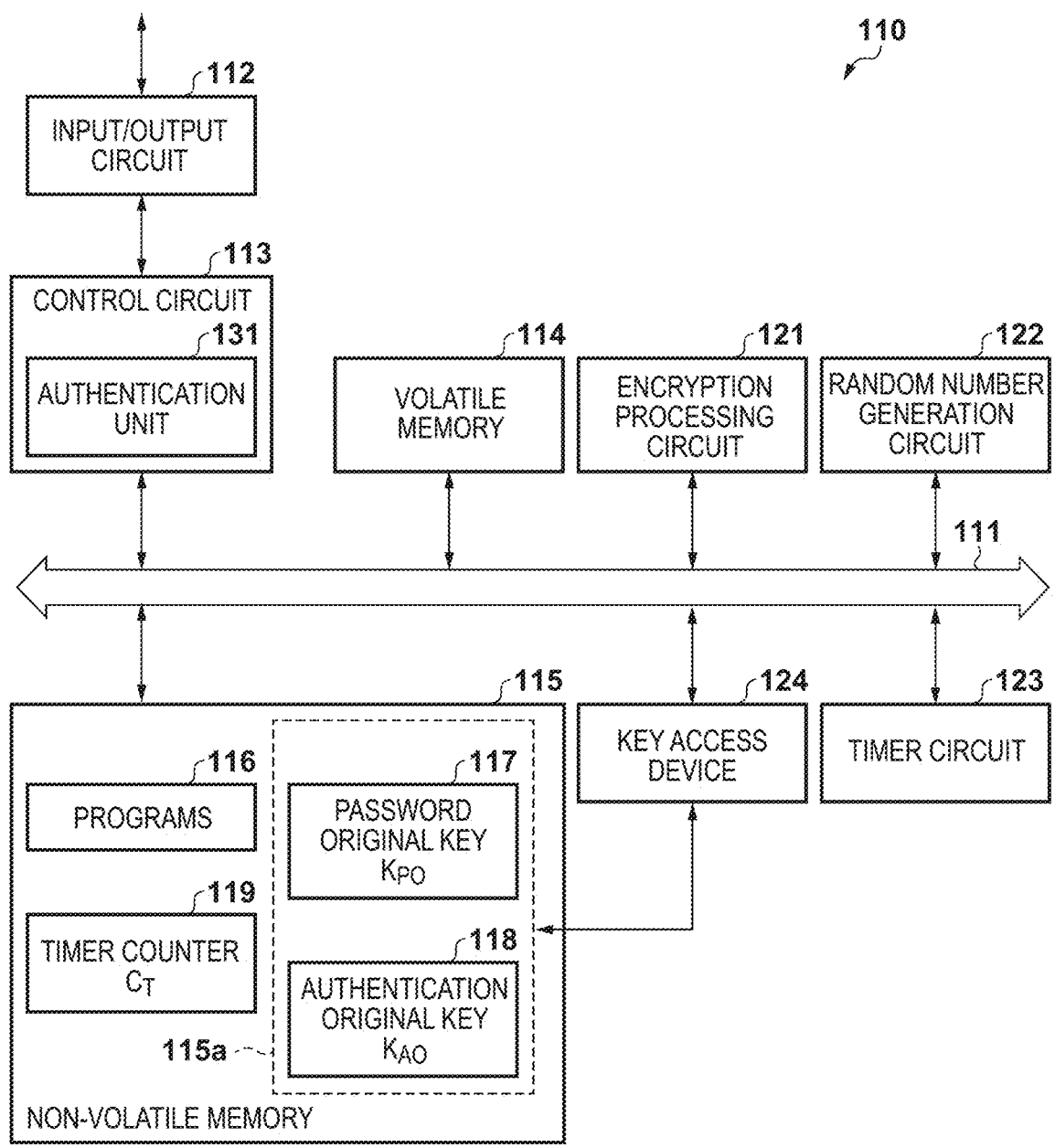
FIG. 2 is a block diagram showing an example of the configuration of an authentication chip according to a first example.

FIG. 2 is a block diagram showing an example of the configuration of the authentication chip 110 according to the first example. As shown in FIG. 2, the authentication chip 110 includes an internal bus 111, an input/output circuit 112, a control circuit 113, a volatile memory 114, a non-volatile memory 115, an encryption processing circuit 121, a random number generation circuit 122, a timer circuit 123, and a key access device 124.

The internal bus 111 is a signal line that interconnects the control circuit 113, the volatile memory 114, the non-volatile memory 115, the encryption processing circuit 121, the random number generation circuit 122, the timer circuit 123, and the key access device 124. The input/output circuit 112 is communication circuitry that relays data between the control unit 107 and the control circuit 113 of the authentication chip 110. The control circuit 113 controls communication with the authentication target apparatus. The control circuit 113 may be processing circuitry such as a central processing unit (CPU), a microcontroller, or a microprocessor, for example, and performs various types of processing in accordance with commands received from the control unit 107. The volatile memory 114 may be random access memory (RAM), for example, and provides the control circuit 113 with a temporary storage area for computation. The non-volatile memory 115 is a storage unit that may include a semiconductor memory or a hard disk, for example.

In the present example, the non-volatile memory 115 stores one or more computer programs 116 executed by the control circuit 113, a password original key ($K_{PO}$) 117, an authentication original key ($K_{AO}$) 118, and a timer counter ($C_T$) 119. The password original key 117 is an example of the above-mentioned restriction data. A password, which will be described below, is derived based on the password original key 117. The authentication original key 118 is a key that serves as the basis for deriving an authentication key used for challenge-response authentication. Whereas the authentication chip 110 stores the authentication original key 118, the authentication target chip 210 stores a corresponding authentication key 218, as will be described below. As shown by a dashed line in FIG. 2, the password original key 117 and the authentication original key 118 are stored in a restricted storage area 115a of the non-volatile memory 115. Access to the restricted storage area 115a (e.g., the reading of data) can only be performed via the key access device 124.

The timer counter 119 is a counter value for monitoring the passage of time while the authentication chip 110 is energized. For example, the timer counter 119 may have a value equal to the above-described reference time as an initial value, and the value may be counted down while the authentication chip 110 is energized. In this case, when the value of timer counter 119 reaches zero, it is determined that the reference time has elapsed.

The encryption processing circuit 121 is a computation unit that executes encryption-related processing, which may include hash function calculation or encryption using a common key encryption scheme. The random number generation circuit 122 is a generation unit that generates random numbers in accordance with commands received from the control circuit 113. The random number generation circuit 122 is used to generate challenge data for challenge-response authentication, for example. The timer circuit 123 is a measurement unit or circuitry that measures the time for which the authentication chip 110 has been energized. Although not shown in FIG. 2, the authentication chip 110 may further include a power supply circuit. The power supply circuit supplies power from an external power source (e.g., a commercial power source or a battery) to units of the authentication chip 110. The non-volatile memory 115 can maintain the above-mentioned programs and data even while the authentication chip 110 is not energized. The key access device 124 is a device that restricts access to the restricted storage area 115a. Before the energized time of the authentication chip 110 reaches the reference time, the key access device 124 blocks access to the restricted storage area 115a. After the energized time of the authentication chip 110 reaches the reference time, the key access device 124 allows an authentication unit 131, which will be described below, to read data from the restricted storage area 115a.

In the present example, the control circuit 113 functions as the authentication unit 131 that performs authentication processing for performing authentication on the authentication target chip 210, in cooperation with the encryption processing circuit 121, the random number generation circuit 122, and the timer circuit 123. The flow of authentication processing will be described in detail below.

2-2. Configuration Example of Authentication Target Chip

Figure 3:
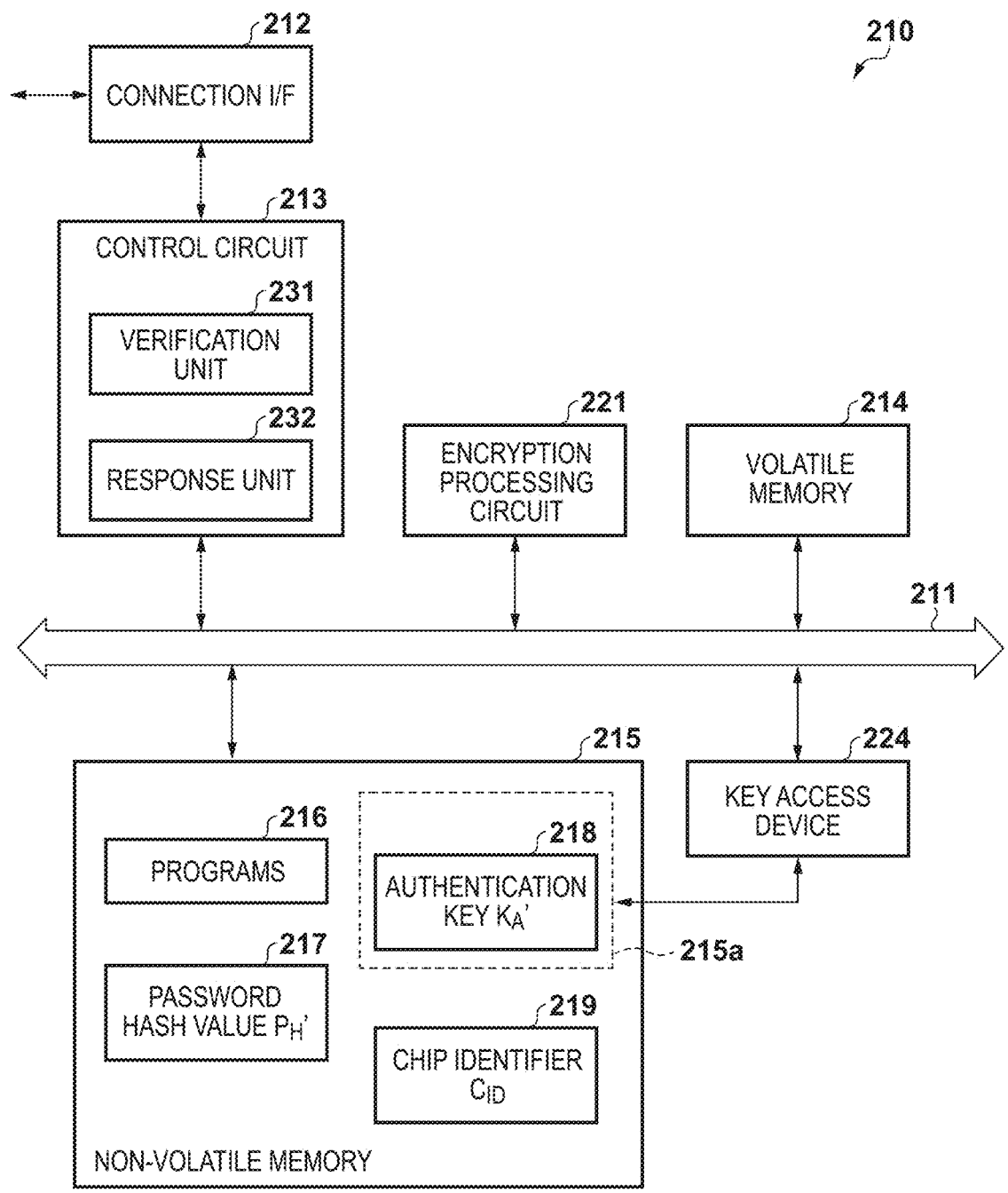
FIG. 3 is a block diagram showing an example of the configuration of an authentication target chip according to the first example.

FIG. 3 is a block diagram showing an example of the configuration of the authentication target chip 210 according to the first example. As shown in FIG. 3, the authentication target chip 210 includes an internal bus 211, a connection I/F 212, a control circuit 213, a volatile memory 214, a non-volatile memory 215, an encryption processing circuit 221, and a key access device 224.

The internal bus 211 is a signal line that interconnects the control circuit 213, the volatile memory 214, the non-volatile memory 215, the encryption processing circuit 221, and the key access device 224. The connection I/F 212 is communication circuitry that is communicably connected to the authentication apparatus. The control circuit 213 controls communication with the authentication apparatus performed via the connection I/F 212. The control circuit 213 may be processing circuitry such as a CPU, a microcontroller, or a microprocessor, for example. The volatile memory 214 may be a RAM, for example, and provides the control circuit 213 with a temporary storage area for computation. The non-volatile memory 215 is a storage unit including a semiconductor memory, for example.

In the present example, the non-volatile memory 215 stores one or more computer programs 216 executed by the control circuit 213, a password hash value ($P_{H'}$) 217, an authentication key ($K_{A'}$) 218, and a chip identifier ($C_{ID}$) 219. The password hash value 217 is an example of the above-mentioned first allowance data. As will be described below, the password hash value 217 is used to determine whether a response to an authentication request received from the authentication chip 110 is allowed. The authentication key 218 is a key (first authentication key) used to generate response data in challenge-response authentication. The authentication key 218 constitutes a key pair of common keys of a common key encryption scheme together with a key (second authentication key) derived based on the authentication original key 118 in the authentication chip 110. As indicated by the dashed line in FIG. 3, the authentication key 218 is stored in a restricted storage area 215a of the non-volatile memory 215. Access to the restricted storage area 215a (e.g., the reading of data) can only be performed via the key access device 224. The chip identifier 219 is an identifier specific to the authentication target chip 210. The chip identifier 219 may be a serial number that uniquely identifies each process cartridge 200 product, for example. The chip identifier 219 is used when deriving the authentication key 218 in advance, and is also transmitted to the authentication chip 110 in order to allow the authentication chip 110 to derive the second authentication key during authentication processing.

Although not shown in FIG. 3, the non-volatile memory 215 may further store one or more control parameters indicating operating conditions suitable for the process cartridge 200. The operating conditions here may be image forming conditions that may include one or more of the following: process speed, charging voltage of a photosensitive body, toner transfer voltage, and fixing temperature, for example. In the case where access to the memory of the authentication target chip 210 is allowed, such control parameters can be read by the control unit 107 from the non-volatile memory 215 via the connection I/F 103 and used to control operation of the image-forming apparatus.

The encryption processing circuit 221 is a computation unit that executes encryption-related processing, which may include hash function calculation or encryption using a common key encryption scheme. The key access device 224 is a device that restricts access to the restricted storage area 215a. The key access device 224 allows data to be read from the restricted storage area 215a only in the case where password verification performed by the verification unit 231, which will be described below, is successful.

In the present example, the control circuit 213 functions as a verification unit 231 and a response unit 232. The verification unit 231 verifies the password (second allowance data) received from the authentication chip 110 via the connection I/F 212, using the password hash value 217 read from the non-volatile memory 215. The response unit 232 performs response processing for challenge-response type authentication in response to a control command received from the authentication chip 110. The processing executed by the verification unit 231 and the response unit 232 will be described in detail below.

Note that circuits shown separately from the control circuit in FIGS. 2 and 3 (e.g., the random number generation circuit and the encryption processing circuit) may each be implemented as a software module executed by the control circuit instead of being implemented as an independent circuit. Furthermore, the modules described as functions of the control circuit (e.g., the authentication unit, the verification unit, and the response unit) may each be implemented as an independent circuit separate from the control circuit. Also, although FIGS. 2 and 3 each show one non-volatile memory, the shown memories may each actually be a collection of memory circuits. For example, the restricted storage area 115a of the authentication chip 110 may be implemented using a storage device separate from the non-volatile memory 115, and the restricted storage area 215a of the authentication target chip 210 may be implemented using a storage device separate from the non-volatile memory 215.

2-3. Authentication Data Generation and Storage in Memory

The manufacturer of the image-forming apparatus 100 and the process cartridge 200 generates the above-described data used for performing authentication on the process cartridge 200 at the manufacturing stage, and stores the data in the memories of the authentication chip 110 and the authentication target chip 210. This section describes processing performed at this manufacturing stage.

Figure 4:
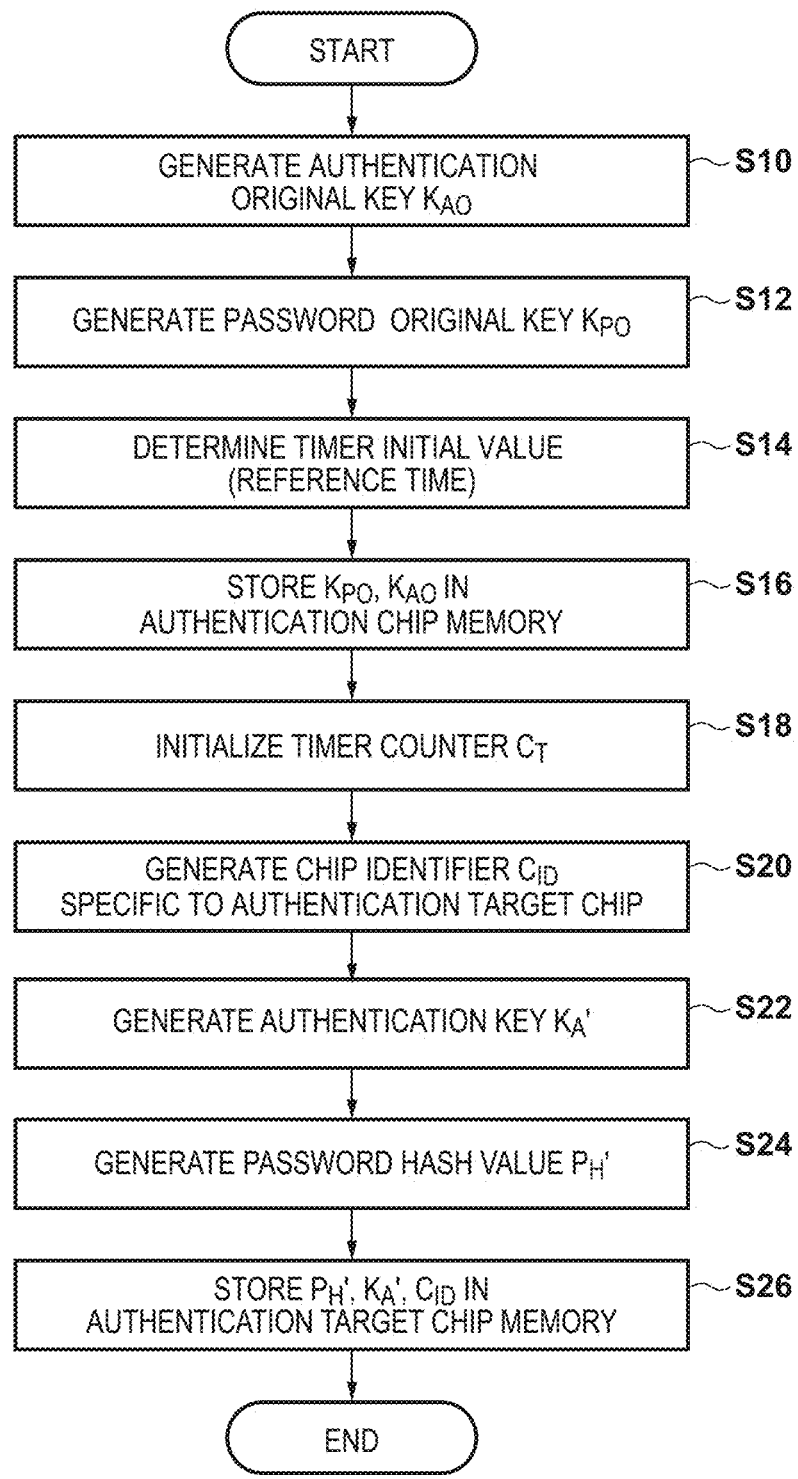
FIG. 4 is a flowchart showing an example of the flow of data generation processing for generating data to be stored in the memories of the authentication chip and the authentication target chip according to the first example.

FIG. 4 is a flowchart showing an example of the flow of data generation processing for generating data to be stored in the non-volatile memory 115 of the authentication chip 110 and the non-volatile memory 215 of the authentication target chip 210. The data generation processing in FIG. 4 may be executed in a factory with use of a device (e.g., a general-purpose computer) different from the image-forming apparatus 100 and the process cartridge 200, for example. Note that in the following description, processing steps will be abbreviated as "S".

As shown in FIG. 4, first, in step S10, an authentication original key $K_{AO}$ is generated. Next, in step S12, a password original key $K_{PO}$ is generated. The authentication original key $K_{AO}$ and the password original key $K_{PO}$ may be random numbers having a predetermined length. Next, in step S14, the initial value (i.e., the reference time) of the countdown timer is determined. The reference time may be any value suitable for making information analysis require a longer time, such as seconds, minutes or hours. Next, in step S16, the authentication original key $K_{AO}$ and the password original key $K_{PO}$ are stored in the restricted storage area 115a of the non-volatile memory 115 of the authentication chip 110. Next, in step S18, a value $C_T$ of the timer counter 119 of the authentication chip 110 is set to the initial value determined in step S14.

Next, in step S20, an identifier (chip identifier) $C_{ID}$ specific to the authentication target chip 210 is generated. The chip identifier $C_{ID}$ may be a random number having a predetermined length. Next, in step S22, an authentication key $K_{A'}$ is derived based on the chip identifier $C_{ID}$ and the authentication original key $K_{AO}$. For example, the authentication key $K_{A'}$ may be generated by: generating input data (also called a payload) by concatenating the chip identifier $C_{ID}$ and the authentication original key $K_{AO}$; and inputting the input data into a hash function, as shown in the following Expression 1:

$$K_{A}' = MSB_L(h1(C_{ID}\|K_{AO})) \quad (1)$$

Here, the operator ∥ represents an operation of concatenating the values before and after the operator. The function h1 is a one-way cryptographic hash function. One example of the cryptographic hash function is SHA256 defined as FIPS PUB 180-4 by National Institute of Standards and Technology (NIST). The function MSBL is a function that extracts the upper L bits (cuts off the remaining bits), where L may be equal to 128, for example. When Expression 1 is adopted, the authentication key $K_{A'}$ can be deterministically derived from the chip identifier $C_{ID}$ and the authentication original key $K_{AO}$, but it is difficult to infer the authentication original key $K_{AO}$ from the authentication key $K_{A'}$.

Alternatively, the authentication key $K_{A'}$ may be generated by encrypting the chip identifier $C_{ID}$ using the authentication original key $K_{AO}$ as a common key, as in the following Expression 2:

$$K_{A}' = Enc_X(K_{AO}, C_{ID}\|c) \quad (2)$$

Here, $Enc_X$ is a function representing encryption processing using the common key encryption scheme X. For example, Advanced Encryption Standard (AES), which is a type of block cipher defined by NIST as FIPS PUB 197, can be used as the common key encryption scheme X, and the block length may be 128 bits, for example. The first argument of the function $Enc_X$ is the common key, and the second argument is the encryption target (also called a plaintext). In the example of Expression 2, a predetermined bit string c is concatenated with the chip identifier $C_{ID}$ in order to match the size of the second argument of the function $Enc_X$ with the block length. When Expression 2 is adopted as well, the authentication key $K_{A'}$ can be deterministically derived from the chip identifier $C_{ID}$ and the authentication original key $K_{AO}$, but it is difficult to infer the authentication original key $K_{AO}$ from the authentication key $K_{A'}$.

Next, in step S24, a password hash value $P_{H'}$ is generated. In the present example, the password hash value $P_{H'}$ can be generated by: deriving a password PW from the password original key $K_{PO}$; and further deriving the hash value $P_{H'}$ from the derived password PW. The password PW may be derived according to the following Expression 3 in which the authentication original key $K_{AO}$ in the argument of Expression 1 above is replaced with the password original key $K_{PO}$:

$$PW = MSB_L(h1(C_{ID}\|K_{PO})) \quad (3)$$

Alternatively, the password PW may be derived according to the following Expression 4 in which the authentication original key $K_{AO}$ in the argument of Expression 2 above is replaced with the password original key $K_{PO}$:

$$PW = Enc_X(K_{PO}, C_{ID}\|c) \quad (4)$$

For example, the password hash value $P_{H'}$ can also be derived using a one-way cryptographic hash function according to Expression 5 shown below, or derived using the common key encryption scheme X according to Expression 6 shown below:

$$P_H' = MSB_L(h1(PW)) \quad (5)$$
$$P_H' = Enc_X(PW, c') \quad (6)$$

Note that the second argument c' in the function $Enc_X$ in Expression 6 may be a predetermined fixed bit string having a length equal to the block length.

Next, in step S26, the password hash value $P_{H'}$, the authentication key $K_{A'}$, and the chip identifier $C_{ID}$ are stored in the non-volatile memory 215 of the authentication target chip 210. The authentication key $K_{A'}$ is stored in the restricted storage area 215a.

Note that if a plurality of process cartridges are manufactured, steps S20 to S26 are iterated multiple times. In each of these iterations, the chip identifier $C_{ID}$ is different for each manufactured process cartridge. Furthermore, if a plurality of image-forming apparatuses are manufactured, steps S10 to S26 may be iterated multiple times. The data generation processing in FIG. 4 then ends.

2-4. Cartridge Authentication

Figure 5:
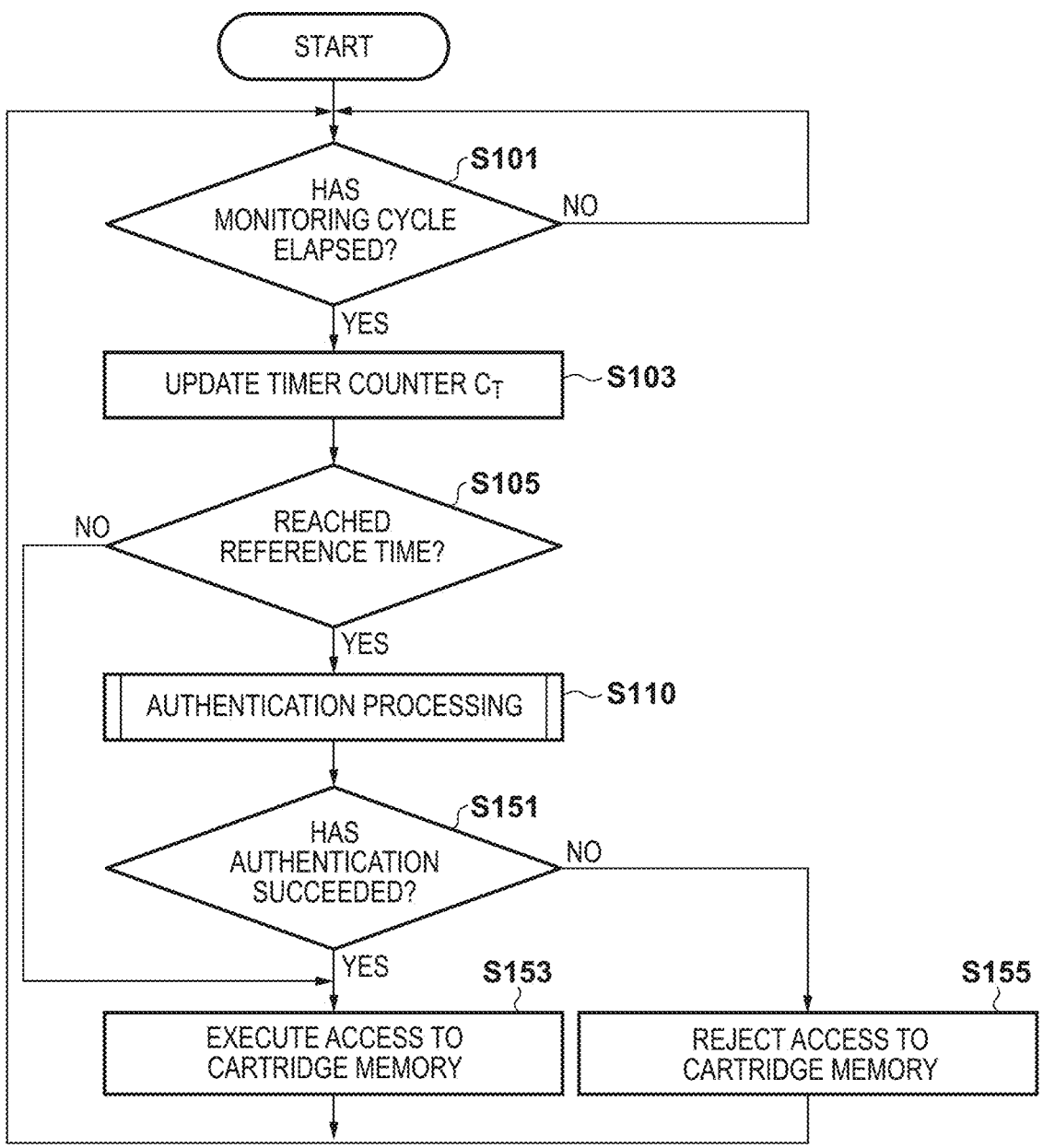
FIG. 5 is a flowchart showing an example of the overall processing flow in the authentication system according to the first example.

FIG. 5 is a flowchart showing an example of the overall processing flow in the authentication system according to the present example.

When triggered by the sensor 105 detecting that the process cartridge 200 is mounted to the image-forming apparatus 100, the control unit 107 transmits a control command to the authentication chip 110 to instruct the start of authentication, and thus the processing shown in FIG. 5 is started, for example. Note that the trigger for starting authentication may not be detection of mounting of the process cartridge 200, and instead may be detection of a user operation requesting start of authentication via the user interface of the image-forming apparatus 100, for example.

As shown in FIG. 5, first, in step S101, the authentication unit 131 of the authentication chip 110 uses the timer circuit 123 to wait until a predetermined monitoring cycle has elapsed. When one monitoring cycle has elapsed, in step S103, the authentication unit 131 subtracts the length of the monitoring cycle from the value $C_T$ of the timer counter (i.e., performs countdown). Next, in step S105, the authentication unit 131 determines whether or not the value $C_T$ of the timer counter has become zero or less, that is to say, whether or not the energized time of the authentication chip 110 has reached the reference time (indicated by the initial value of $C_T$). If the energized time of the authentication chip 110 has reached the reference time, the authentication processing of step S110 is executed. On the other hand, if the energized time of the authentication chip 110 has not reached the reference time, the authentication processing of step S110 is skipped.

Figure 6:
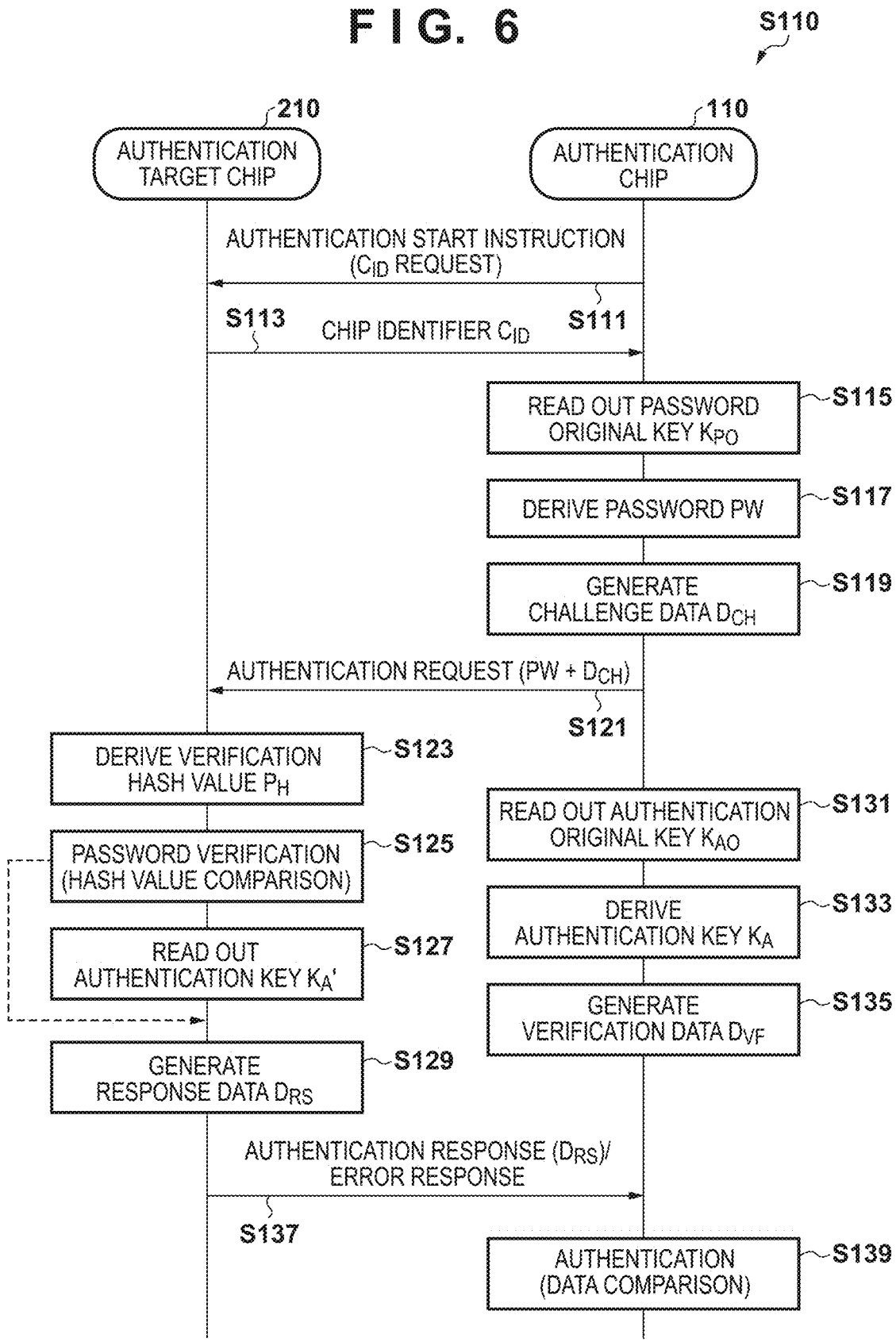
FIG. 6 is a sequence diagram showing an example of the detailed flow of authentication processing according to the first example.

FIG. 6 is a sequence diagram showing an example of the detailed flow of the authentication processing executed in step S110 of FIG. 5. The authentication chip 110 of the image-forming apparatus 100 and the authentication target chip 210 of the process cartridge 200 are mainly involved in the authentication processing. Although the connection I/F 103 of the engine controller 101 is interposed in the communication path between the authentication chip 110 and the authentication target chip 210, the connection I/F 103 is not shown in FIG. 6.

First, in step S111, the authentication unit 131 transmits an authentication start instruction to the authentication target chip 210. The authentication start instruction may include a request to read the chip identifier $C_{ID}$. Alternatively, a signal requesting reading of the chip identifier $C_{ID}$ may be transmitted separately from the authentication start instruction. In step S113, in response to the request from the authentication unit 131, the response unit 232 of the authentication target chip 210 reads the chip identifier $C_{ID}$ from the non-volatile memory 215 and transmits the read information to the authentication chip 110. The input/output circuit 112 of the authentication chip 110 receives the chip identifier $C_{ID}$ transmitted from the authentication target chip 210.

Next, in step S115, the authentication unit 131 reads the password original key $K_{PO}$ from the restricted storage area 115a of the non-volatile memory 115 via the key access device 124. If the energized time has reached the reference time, the key access device 124 allows access to the restricted storage area 115a. Next, in step S117, the authentication unit 131 derives the password PW based on the read password original key $K_{PO}$ and the received chip identifier $C_{ID}$. The password PW can be derived using the encryption processing circuit 121 according to Expression 3 or Expression 4 mentioned above, for example. Next, in step S119, the authentication unit 131 causes the random number generation circuit 122 to generate a random number $D_{CH}$ as challenge data.

Next, in step S121, the authentication unit 131 transmits an authentication request, which includes the password PW derived in step S117 and the challenge data $D_{CH}$ generated in step S119, to the authentication target chip 210 via the input/output circuit 112. The password PW transmitted here serves the role of second allowance data that is based on the password original key $K_{PO}$ serving as restriction data. The connection I/F 212 of the authentication target chip 210 receives the authentication request transmitted from the authentication chip 110.

The verification unit 231 of the authentication target chip 210 determines whether or not to allow a response to the authentication request received from the authentication chip 110, by verifying the validity of the password PW. Specifically, in step S123, the verification unit 231 derives a verification hash value $P_H$ based on the password PW received together with the authentication request. Similarly to the password hash value $P_{H'}$, the verification hash value $P_H$ can be derived according to Expression 5 or Expression 6 mentioned above. Next, in step S125, the verification unit 231 verifies the validity of the password PW by comparing the derived verification hash value $P_H$ with the password hash value $P_{H'}$ read from the non-volatile memory 215. The password hash value $P_{H'}$ here serves as first allowance data used to verify the second allowance data. If the two hash values match each other, it is determined that password verification is successful, and access to the restricted storage area 215a via the key access device 224 is allowed. If the two hash values do not match each other in step S125, it is determined that password verification is unsuccessful, and access to the restricted storage area 215a is not allowed.

If password verification is successful, in step S127, the response unit 232 of the authentication target chip 210 reads the authentication key $K_{A'}$ from the restricted storage area 215a via the key access device 224. Next, in step S129, the response unit 232 causes the encryption processing circuit 221 to generate response data $D_{RS}$ based on the challenge data $D_{CH}$ received from the authentication chip 110 and the authentication key $K_{A'}$. For example, the response data $D_{RS}$ may be generated by: generating input data by concatenating the authentication key $K_{A'}$ and the challenge data $D_{CH}$; and inputting the input data to a hash function, as shown in the following Expression 7:

$$D_{RS} = MSB_L(h1(K_A' \| D_{CH})) \quad (7)$$

As mentioned above, the function h1 may be a one-way cryptographic hash function, and the function MSBL may be a function that extracts the upper L bits of the argument. Alternatively, the response data $D_{RS}$ may be generated by encrypting the challenge data $D_{CH}$ using the authentication key $K_{A'}$ as a common key, as in the following Expression 8:

$$D_{RS} = Enc_X(K_A', D_{CH}) \quad (8)$$

As described above, $Enc_X$ is a function representing encryption processing using the common key encryption scheme X. For example, AES (NIST FIPS PUB 197) with a block length of 128 bits may be used as the common key encryption scheme X. Alternatively, the response data $D_{RS}$ may be generated by deriving a message authentication code (MAC) of the challenge data $D_{CH}$ using the authentication key $K_{A'}$ as a common key, as in the following Expression 9:

$$D_{RS} = MAC_Y(K_A', D_{CH}) \quad (9)$$

Here, $MAC_Y$ is a function representing encryption processing for generating a message authentication code. For example, a hash-based MAC (HMAC) defined in the NIST FIPS PUB 198-1 standard or a cipher-based MAC (CMAC) defined in NIST SP 800-38B may be used as the message authentication code generation method Y.

Then, in step S137, the response unit 232 returns the response data $D_{RS}$ to the authentication chip 110 as a response to the authentication request. Note that if the password verification in step S125 fails, the response unit 232 returns an error response to the authentication chip 110 without reading out the authentication key $K_{A'}$. In FIG. 6, the processing path in which reading of the authentication key $K_{A'}$ is skipped is shown by a dashed line.

In the meantime, in step S131, the authentication unit 131 of the authentication chip 110 that transmitted the authentication request in step S121 reads the authentication original key $K_{AO}$ from the restricted storage area 115a via the key access device 124. Next, in step S133, the authentication unit 131 causes the encryption processing circuit 121 to derive the authentication key $K_A$ based on the chip identifier $C_{ID}$ received from the authentication target chip 210 and the read authentication original key $K_{AO}$. Similarly to the authentication key $K_{A'}$, the authentication key $K_A$ can be derived according to Expression 1 or Expression 2 mentioned above. In the case where Expression 1 is used, the authentication key $K_{A'}$ (first authentication key) and the authentication key $K_A$ (second authentication key) are both derived by inputting input data that is based on the common authentication original key $K_{AO}$ and the chip identifier $C_{ID}$ to a cryptographic hash function. In the case where Expression 2 is used, both the authentication key $K_{A'}$ (first authentication key) and the authentication key $K_A$ (second authentication key) are derived by encrypting the chip identifier $C_{ID}$ using the common authentication original key $K_{AO}$ as the encryption key. Next, in S135, the authentication unit 131 generates verification data $D_{VF}$ based on the challenge data $D_{CH}$ transmitted to the authentication target chip 210 and the authentication key $K_A$ generated in step S133. Similarly to the response data $D_{RS}$, the verification data $D_{VF}$ can be generated according to Expression 7, Expression 8, or Expression 9 mentioned above.

In step S137, the input/output circuit 112 of the authentication chip 110 receives the authentication response transmitted from the authentication target chip 210. If the password verification performed in the authentication target chip 210 is successful, the authentication response includes the response data $D_{RS}$. If the password verification fails in the authentication target chip 210, the authentication response is an error response. The authentication unit 131 performs authentication on the authentication target chip 210 based on the authentication response.

Specifically, in step S139, the authentication unit 131 verifies the validity of the response data $D_{RS}$ by determining whether or not the response data $D_{RS}$ included in the authentication response matches the verification data $D_{VF}$ generated in step S135. If the response data $D_{RS}$ matches the verification data $D_{VF}$, the authentication unit 131 determines that authentication of the process cartridge 200 is successful. If the response data $D_{RS}$ does not match the verification data $D_{VF}$, or if the authentication response is an error response, the authentication unit 131 determines that authentication of the process cartridge 200 is unsuccessful. The authentication unit 131 reports the authentication result determined in step S139 to the control unit 107.

Returning to FIG. 5, the subsequent processing branches in step S151 depending on whether the authentication of the process cartridge 200 (authentication target chip 210) has been successful or failed. If the authentication is unsuccessful, access to the memory of the process cartridge 200 is allowed. In this case, the control unit 107 accesses the memory of the process cartridge 200 in step S153. For example, the control unit 107 may read control parameters indicating the above-mentioned operating conditions from the non-volatile memory 215, and control the operation of the image-forming unit according to the read control parameters. Also in the case where it is determined in step S105 that the energized time of the authentication chip 110 has not reached the reference time, access to the memory of the process cartridge 200 is allowed.

If authentication of the process cartridge 200 (authentication target chip 210) has failed, access to the memory of the process cartridge 200 (e.g., reading of control parameters indicating the above-mentioned operating conditions) is prohibited. In this case, in step S155, the control unit 107 may warn the user that the process cartridge 200 is not a genuine product. The warning here may be performed using any method, such as displaying a warning message on the display of the image-forming apparatus 100, lighting a warning light, or outputting an alarm sound.

Note that throughout the description, the processing steps illustrated in the flowcharts and sequence diagrams may be performed in an order different from the illustrated order. For example, the generation of the verification data $D_{VF}$ by the authentication chip 110 in the authentication processing in FIG. 6 may be performed at any timing, such as before the transmission of an authentication request to the authentication target chip 210, or after the reception of an authentication response from the authentication target chip 210.

2-5. Summary of First Example

In the first example described above, the authentication target apparatus (authentication target chip) stores pre-set first allowance data (password hash value) used to determine whether a response to an authentication request received from the authentication apparatus (authentication chip) is allowed. The authentication target apparatus does not access authentication data (authentication key) used for main authentication stored in the internal memory until valid second allowance data (password) is received from the authentication apparatus. Meanwhile, the authentication apparatus stores, in advance, restriction data (password original key) that serves as the basis for deriving the second allowance data in an internal memory, but reading of the restriction data from the memory is made possible only after the energized time of the authentication apparatus has reached a pre-set reference time. Therefore, even if an attacker attempts to perform semiconductor behavior analysis such as microprobing while operating the authentication target apparatus, allowance data and authentication data cannot be probed until the reference time has elapsed. In this way, by delaying the timing at which meaningful information is exposed in an information analysis type attack, it is possible to lower the probability that the attack succeeds within a realistic time constraint, and thus enhance resistance to attacks. Also, since such a delay does not rely on variations in secret information, it is possible to avoid an increase in cost due to an increase in the scale of non-volatile memory.

Furthermore, in the first example described above, the authentication target apparatus stores, in advance, an identifier (chip identifier) specific to the apparatus. The authentication unit of the authentication apparatus derives second allowance data based on restriction data read from the memory after the reference time has elapsed and the identifier received from the authentication target apparatus. Therefore, the second allowance data transmitted from the authenticating device to the authentication target apparatus is different for each authentication target apparatus, thus making it possible to prevent fraud such as the second allowance data acquired using one authentication target apparatus being reused for another authentication target apparatus. Moreover, since the second allowance data is derived using a one-way cryptographic hash function, it is also impossible to infer the restriction data using changes in the second allowance data as a clue.

Also, in the first example described above, the authentication target apparatus stores the first authentication key, which was derived in advance based on an identifier of the authentication target apparatus and is used to generate response data from challenge data received together with an authentication request from the authentication target apparatus. The authentication unit of the authentication apparatus derives a second authentication key based on the identifier of the authentication target apparatus and performs authentication on the authentication target apparatus by performing verification on the response data from the authentication target apparatus using the derived second authentication key. In this way, by using challenge-response authentication with a different common key pair (the first authentication key and the second authentication key) set for each authentication target apparatus, even if one of the authentication keys is leaked, it is meaningless to reuse that authentication key in another apparatus.

Also, in the first example described above, before the energized time of the authentication apparatus reaches the reference time, access to the memory of the authentication apparatus (e.g., the reading of control parameters) is allowed without performing authentication on the authentication apparatus. Therefore, even if the timing of authentication is delayed, a genuine exchangeable component provided with the authentication target apparatus can be used as normal by the user from when the component is acquired.

Note that in this specification, expressions such as a first element being "based on" a second element and a second element serving as a "basis of" the first element are used, but this does not exclude modes in which the first element is equivalent to the second element. For example, the expression "transmit the second allowance data that is based on the restriction data" is intended to include a mode in which the restriction data is transmitted as-is as the second allowance data.

3. Second Example 3-1. Configuration Example of Authentication Chip

The first example described in the previous section can be implemented using challenge-response authentication that is based on a common key encryption scheme, whereas the second example described in this section can be implemented using challenge-response authentication that is based on a public key encryption scheme.

Figure 7:
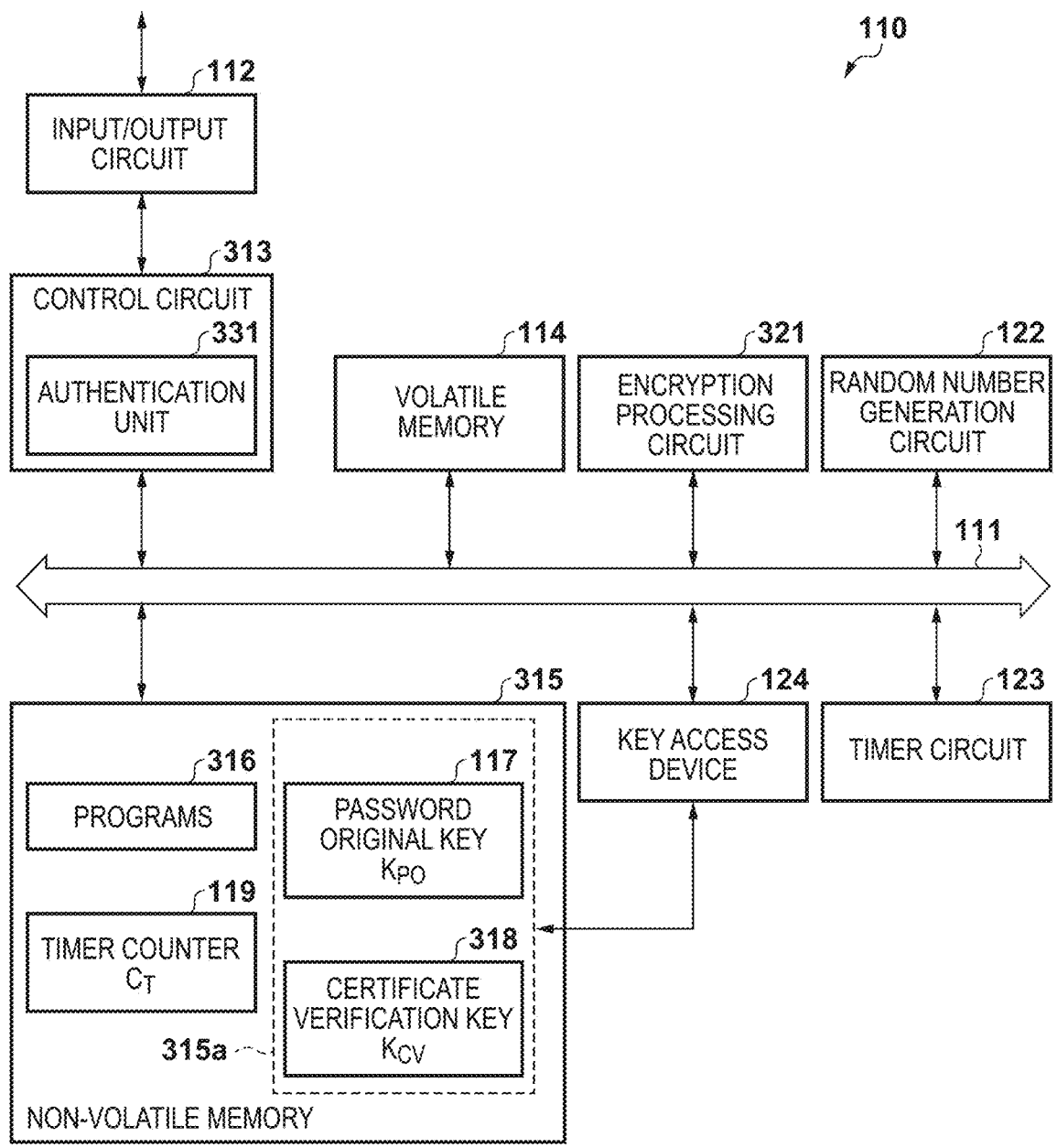
FIG. 7 is a block diagram showing an example of the configuration of an authentication chip according to a second example.

FIG. 7 is a block diagram showing an example of the configuration of the authentication chip 110 according to the second example. As shown in FIG. 7, the authentication chip 110 includes the internal bus 111, the input/output circuit 112, a control circuit 313, the volatile memory 114, a non-volatile memory 315, an encryption processing circuit 321, the random number generation circuit 122, the timer circuit 123, and the key access device 124.

The control circuit 313 controls communication with the authentication target apparatus. The control circuit 313 may be processing circuitry such as a CPU, a microcontroller, or a microprocessor, for example, and performs various types of processing in accordance with commands received from the control unit 107. The non-volatile memory 315 is a storage unit that may include a semiconductor memory or a hard disk, for example.

In the present example, the non-volatile memory 315 stores one or more computer programs 316, a password original key ($K_{PO}$) 117, a certificate verification key ($K_{CV}$) 318, and a timer counter ($C_T$) 119. The certificate verification key 318 is a public key used to verify the authenticity of a below-described chip verification key $K_V$ received from the authentication target chip 210. As indicated by the dashed line in FIG. 7, the password original key 117 and the certificate verification key 318 are stored in a restricted storage area 315a of the non-volatile memory 315. Access to the restricted storage area 315a (e.g., the reading of data) can only be performed via the key access device 124. Before the energized time of the authentication chip 110 reaches the reference time, the key access device 124 blocks access to the restricted storage area 315a. After the energized time of the authentication chip 110 reaches the reference time, the key access device 124 allows the authentication unit 331, which will be described below, to read data from the restricted storage area 315a.

The encryption processing circuit 321 is a computation unit that executes encryption-related processing, which may include hash function calculation, encryption using a common key encryption scheme, digital signature verification, and certificate verification. Although not shown in FIG. 7, the authentication chip 110 may further include a power supply circuit. The power supply circuit supplies power from an external power source to units of the authentication chip 110. The non-volatile memory 315 can maintain the above-mentioned programs and data even while the authentication chip 110 is not energized.

In the present example, the control circuit 313 functions as an authentication unit 331 that performs authentication processing for performing authentication on the authentication target chip 210, in cooperation with the encryption processing circuit 321, the random number generation circuit 122, and the timer circuit 123. The flow of authentication processing will be described in detail below.

3-2. Configuration Example of Authentication Target Chip

Figure 8:
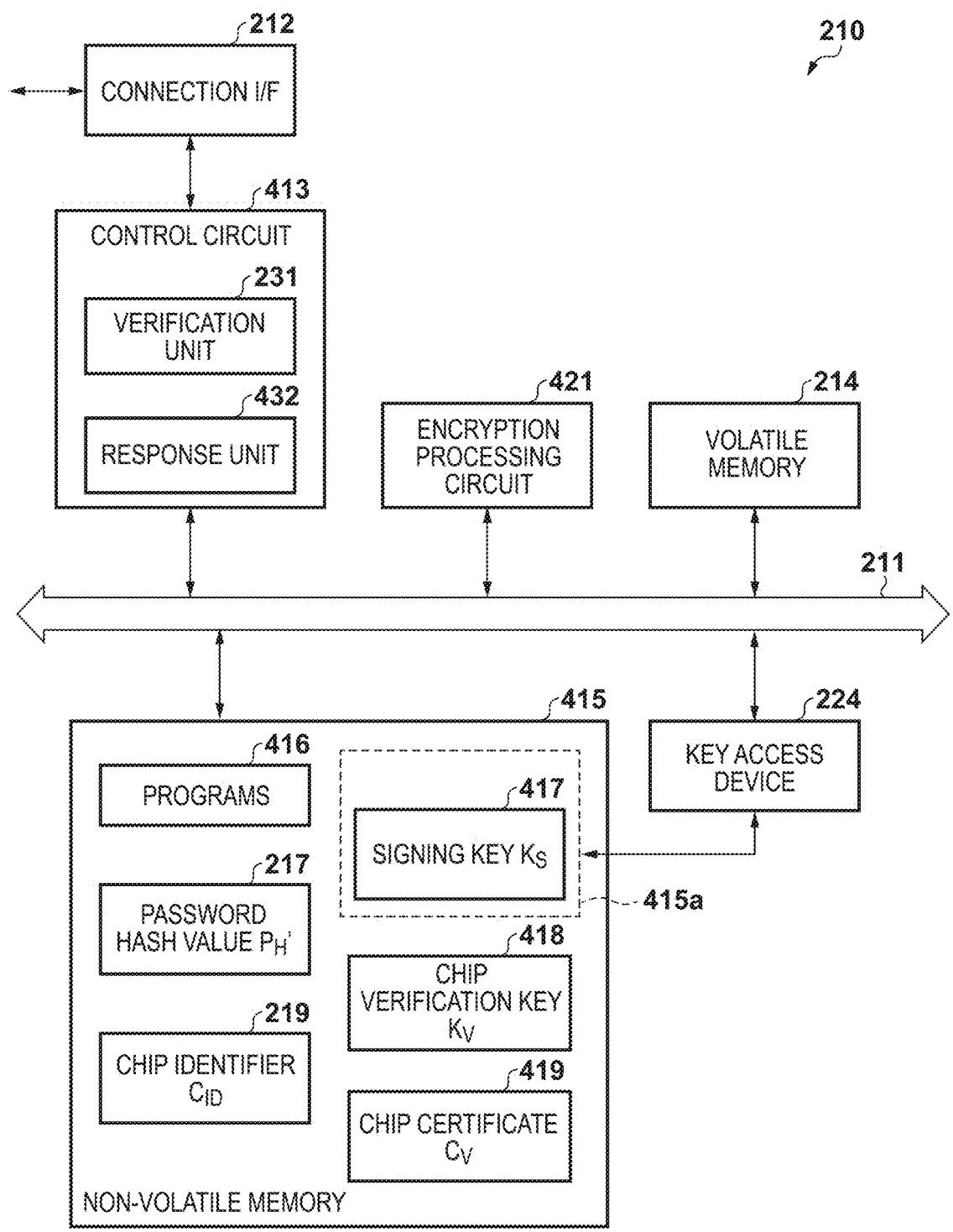
FIG. 8 is a block diagram showing an example of the configuration of an authentication target chip according to the second example.

FIG. 8 is a block diagram showing an example of the configuration of the authentication target chip 210 according to the second example. As shown in FIG. 8, the authentication target chip 210 includes the internal bus 211, the connection I/F 212, a control circuit 413, the volatile memory 214, a non-volatile memory 415, an encryption processing circuit 421, and the key access device 224.

The control circuit 413 controls communication with the authentication apparatus performed via the connection I/F 212. The control circuit 413 may be processing circuitry such as a CPU, a microcontroller, or a microprocessor, for example. The non-volatile memory 415 is a storage unit including a semiconductor memory, for example.

In the present example, the non-volatile memory 415 stores one or more computer programs 416, a password hash value ($P_{H'}$) 217, a chip identifier ($C_{ID}$) 219, a signing key ($K_S$) 417, a chip verification key ($K_V$) 418, and a chip certificate ($C_V$) 419. The signing key 417 is a private key in a public key encryption scheme and is used to generate a digital signature for challenge data received together with an authentication request from the authentication chip 110. The chip verification key 418 is a public key corresponding to the signing key 417. The chip certificate 419 is an electronic certificate that proves the authenticity of chip verification key 418. As indicated by the dashed line in FIG. 8, the signing key 417 is stored in a restricted storage area 415a of the non-volatile memory 415. Access to the restricted storage area 415a (e.g., the reading of data) can only be performed via the key access device 224. The key access device 224 allows data to be read from the restricted storage area 415a only in the case where password verification performed by the verification unit 231, which will be described below, is successful.

The encryption processing circuit 421 is a computation unit that executes encryption-related processing, which may include hash function calculation, encryption using a common key encryption scheme, and digital signature generation.

In the present example, the control circuit 413 functions as the verification unit 231 and a response unit 432. The response unit 432 performs response processing for challenge-response type authentication in response to a control command received from the authentication chip 110. The processing executed by the response unit 432 will be described in detail below.

Note that circuits shown separately from the control circuit in FIGS. 7 and 8 may each be implemented as a software module executed by the control circuit instead of being implemented as an independent circuit. Furthermore, the modules described as functions of the control circuit may each be implemented as an independent circuit separate from the control circuit. Also, although FIGS. 7 and 8 each show one non-volatile memory, the shown memories may each actually be a collection of memory circuits.

3-3. Authentication Data Generation and Storage in Memory

Figure 9:
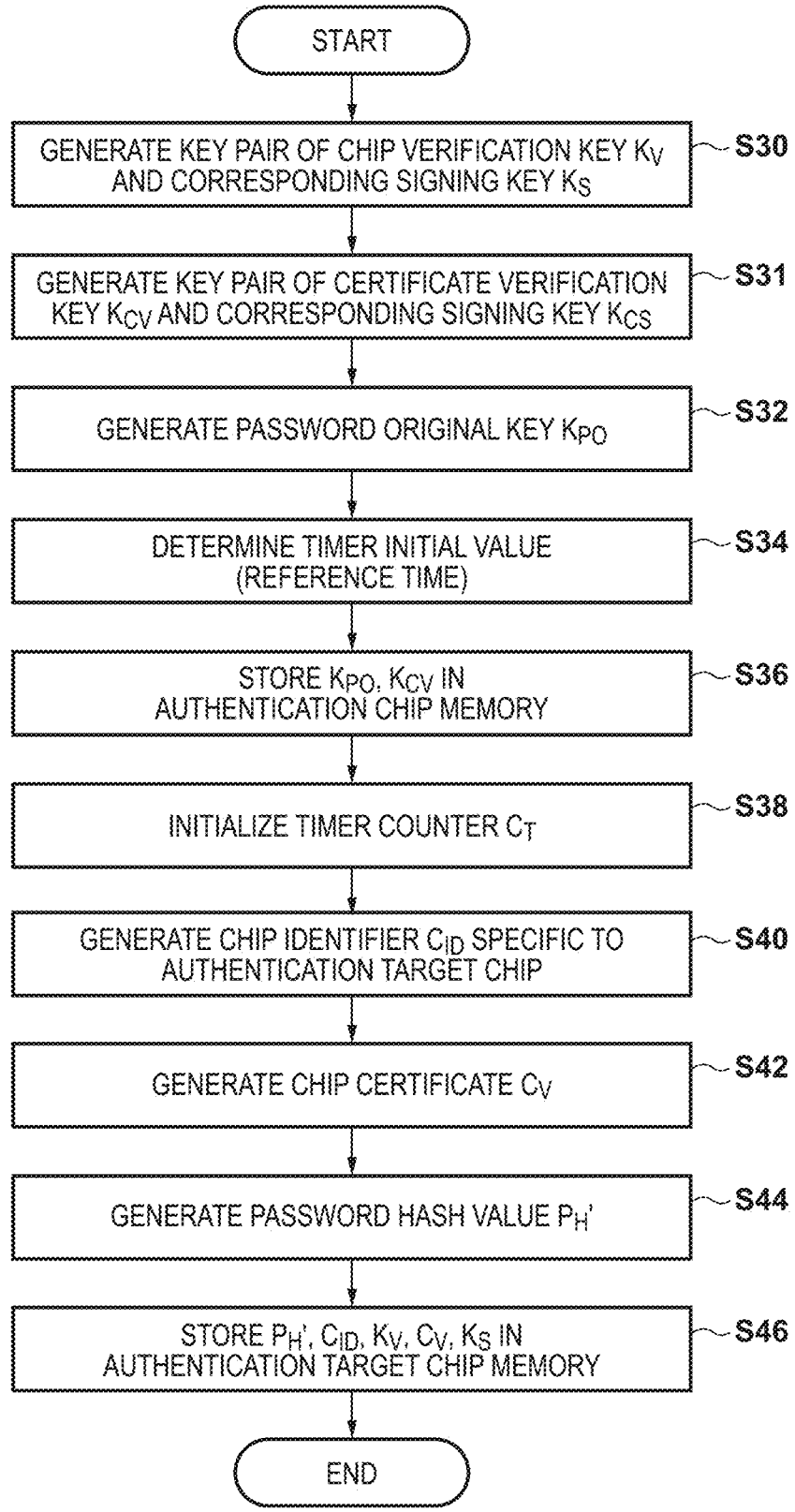
FIG. 9 is a flowchart showing an example of the flow of data generation processing for generating data to be stored in the memories of the authentication chip and the authentication target chip according to the second example.

FIG. 9 is a flowchart showing an example of the flow of data generation processing for generating data to be stored in the non-volatile memory 315 of the authentication chip 110 and the non-volatile memory 415 of the authentication target chip 210. The data generation processing in FIG. 9 may be executed in a factory with use of a device different from the image-forming apparatus 100 and the process cartridge 200, for example.

As shown in FIG. 9, first, in step S30, a key pair including a chip verification key $K_V$ and a corresponding signing key $K_S$ is generated. Next, in step S31, a key pair including a certificate verification key $K_{CV}$ and a corresponding certificate signing key $K_{CS}$ is generated. Next, in step S32, a password original key $K_{PO}$ is generated. Next, in step S34, the initial value (i.e., the reference time) of the countdown timer is determined. Next, in step S36, the password original key $K_{PO}$ and the certificate verification key $K_{CV}$ are stored in the restricted storage area 315a of the non-volatile memory 315 of the authentication chip 110. Next, in step S38, the value $C_T$ of the timer counter 119 of the authentication chip 110 is set to the initial value determined in step S34.

Next, in step S40, an identifier (chip identifier) $C_{ID}$ specific to the authentication target chip 210 is generated. Next, in step S42, a chip certificate $C_V$ that proves the authenticity of input data, which is obtained by concatenating the chip identifier $C_{ID}$ and the chip verification key $K_V$, is generated using the certificate signing key $K_{CS}$. A digital signature value $\sigma_{CV}$ of the chip certificate $C_V$ may be generated according to the following Expression 10, for example:

$$\sigma_{CV} = \text{Sign}(K_{CS}, C_{ID} \| K_V) \tag{10}$$

The function Sign in Expression 10 represents a digital signature algorithm. The digital signature algorithm used here may be an algorithm defined by NIST as FIPS PUB 186-4, for example. The first argument of the function Sign is the certificate signing key $K_{CS}$ serving as the private key, and the second argument is the concatenation of the chip identifier $C_{ID}$ and the chip verification key $K_V$.

Next, in step S44, similarly to S24 in the first example, a password hash value $P_{H'}$ is generated based on the password original key $K_{PO}$. Next, in step S46, the password hash value $P_{H'}$, the chip identifier $C_{ID}$, the chip verification key $K_V$, the chip certificate $C_V$, and the signing key $K_S$ are stored in the non-volatile memory 415 of the authentication target chip 210. The signing key $K_S$ is stored in the restricted storage area 415a.

Note that if a plurality of process cartridges are manufactured, steps S40 to S46 are iterated multiple times. In each of these iterations, the chip identifier $C_{ID}$ is different for each manufactured process cartridge. Furthermore, if a plurality of image-forming apparatuses are manufactured, steps S30 to S46 may be iterated multiple times. The data generation processing in FIG. 9 then ends.

3-4. Cartridge Authentication

Figure 10:
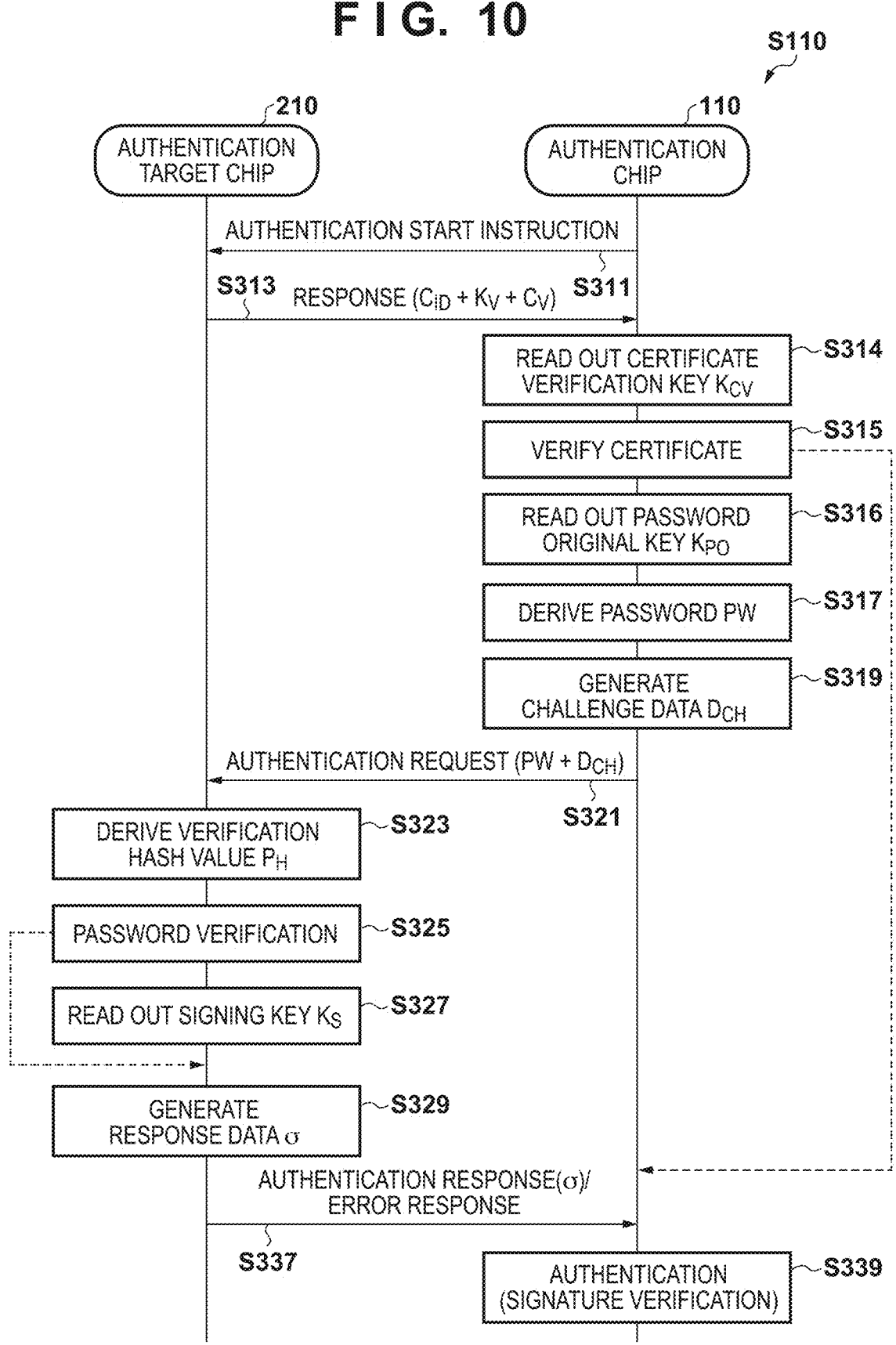
FIG. 10 is a sequence diagram showing an example of the detailed flow of authentication processing according to the second example.

The overall processing flow in the authentication system according to the present example may be similar to the flow in the first example described using FIG. 5. FIG. 10 is a sequence diagram showing an example of the detailed flow of the authentication processing executed in step S110 of FIG. 5. The authentication chip 110 of the image-forming apparatus 100 and the authentication target chip 210 of the process cartridge 200 are mainly involved in the authentication processing. Although the connection I/F 103 of the engine controller 101 is interposed in the communication path between the authentication chip 110 and the authentication target chip 210, the connection I/F 103 is not shown in FIG. 10.

First, in step S311, the authentication unit 331 of the authentication chip 110 transmits an authentication start instruction to the authentication target chip 210. The authentication start instruction may include a request to read the chip identifier $C_{ID}$. Alternatively, a signal requesting reading of the chip identifier $C_{ID}$ may be transmitted separately from the authentication start instruction. In step S313, in response to the request from the authentication unit 331, the response unit 432 of the authentication target chip 210 reads the chip identifier $C_{ID}$, the chip verification key $K_V$, and the chip certificate Cy from the non-volatile memory 415 and transmits the read information to the authentication chip 110. The input/output circuit 112 of the authentication chip 110 receives the data transmitted from the authentication target chip 210.

Next, in step S314, the authentication unit 331 reads the certificate verification key $K_{CV}$ from the restricted storage area 315a of the non-volatile memory 315 via the key access device 124. Next, in step S315, the authentication unit 331 verifies the authenticity of the chip verification key $K_V$ (and the chip identifier $C_{ID}$) based on the chip certificate Cy received from the authentication target chip 210. For example, the authenticity verification here can be expressed as the following Expression 11:

$$res = \text{Verify}(K_{CV}, C_{ID} \| K_V, C_V) \tag{11}$$

The function Verify in Expression 11 represents a digital signature verification algorithm corresponding to the digital signature algorithm used in Expression 10. The first argument of the function Verify is the certificate verification key $K_{CV}$, which is the public key corresponding to the certificate signing key $K_{CS}$, the second argument is the concatenation of the chip identifier $C_{ID}$ and the chip verification key $K_V$, and the third argument is the chip certificate $C_V$ (the signature value included therein). The output "res" of the function Verify is a logical value ("true" or "false") indicating the signature verification result, that is to say whether or not the verification has been successful or failed. If the authenticity of the chip verification key $K_V$ is confirmed in step S315, the chip verification key $K_V$ is used to verify the digital signature included in the authentication response in the subsequent main authentication. If the authenticity of the chip verification key $K_V$ and chip identifier $C_{ID}$ is not confirmed, the subsequent password authentication and main authentication are skipped, as indicated by the dashed line in the figure.

Here, assume that the authenticity of the chip verification key $K_V$ and the chip identifier $C_{ID}$ has been confirmed. In step S316, the authentication unit 331 reads the password original key $K_{PO}$ from the restricted storage area 315a of the non-volatile memory 315 via the key access device 124. If the energized time has reached the reference time, the key access device 124 allows access to the restricted storage area 315a. Next, in step S317, the authentication unit 331 derives the password PW based on the password original key $K_{PO}$ and the chip identifier $C_{ID}$. The password PW can be derived using the encryption processing circuit 321 according to Expression 3 or Expression 4 mentioned above, for example. Next, in step S319, the authentication unit 331 causes the random number generation circuit 122 to generate a random number $D_{CH}$ as challenge data.

Next, in step S321, the authentication unit 331 transmits an authentication request, which includes the password PW derived in step S317 and the challenge data $D_{CH}$ generated in step S319, to the authentication target chip 210 via the input/output circuit 112. The connection I/F 212 of the authentication target chip 210 receives the authentication request transmitted from the authentication chip 110.

In steps S323 and S325, the verification unit 231 of the authentication target chip 210 determines whether or not to allow a response to the authentication request received from the authentication chip 110, by verifying the validity of the password PW. Steps S323 and S325 may be the same processing steps as steps S123 and S125 in FIG. 6, and thus descriptions thereof will be omitted here.

If password verification has been successful, in step S327, the response unit 432 of the authentication target chip 210 reads the signing key $K_S$ from the restricted storage area 415a via the key access device 224. Next, in step S329, the response unit 432 causes the encryption processing circuit 421 to generate response data σ based on the challenge data $D_{CH}$ and the signing key $K_S$ received from the authentication chip 110. For example, the response data σ may be a digital signature value generated according to the following Expression 12:

$$\sigma = \text{Sign}(K_S, D_{CH}) \quad (12)$$

The function Sign in Expression 12 represents the same digital signature algorithm as in Expression 10. However, a digital signature algorithm different from Expression 10 may be used here. The first argument of the function Sign is the signing key $K_S$ serving as the private key, and the second argument is the challenge data $D_{CH}$.

Then, in step S337, the response unit 432 returns the response data σ to the authentication chip 110 as a response to the authentication request. Note that if the password verification in step S325 fails, the response unit 432 returns an error response to the authentication chip 110 without reading the signing key $K_S$. In FIG. 10, the processing path in which reading of the signing key $K_S$ is skipped is shown by a dashed line.

The input/output circuit 112 of the authentication chip 110 receives the authentication response transmitted from the authentication target chip 210. If the password verification is successful in the authentication target chip 210, the authentication response includes the response data (digital signature value) σ. If the password verification fails in the authentication target chip 210, the authentication response is an error response. The authentication unit 331 performs authentication on the authentication target chip 210 based on the authentication response.

Specifically, in step S339, the authentication unit 331 performs authentication on the authentication target chip 210 by performing verification on the signature value σ included in the authentication response using the chip verification key $K_V$ and the challenge data $D_{CH}$. For example, the verification of the signature value σ here can be expressed as the following Expression 13:

$$res = \text{Verify}(K_{CV}, D_{CH}, \sigma) \quad (13)$$

The function Verify in Expression 13 represents a digital signature verification algorithm corresponding to the digital signature algorithm used in Expression 12. The first argument of the function Verify is the chip verification key $K_V$, which is the public key corresponding to the signing key $K_S$, the second argument is the challenge data $D_{CH}$, and the third argument is the signature value σ that is to be verified. The output "res" of the function Verify is a logical value ("true" or "false") indicating the signature verification result, that is to say whether or not the verification has been successful or failed. If the digital signature value σ received together with the authentication response is valid, the signature verification result "res" indicates "true" according to the mechanism of public key encryption. If the digital signature value σ is invalid, the signature verification result "res" indicates "false".

If the signature verification result "res" indicates "true", the authentication unit 331 determines that the authentication of the process cartridge 200 has been successful. If the signature verification result "res" indicates "false" or if the authentication response is an error response, the authentication unit 331 determines that the authentication of the process cartridge 200 has failed. The authentication unit 331 reports the authentication result determined in step S339 to the control unit 107.

Note that the message inputs (the second arguments) in the signature function Sign of Expression 12 and the signature verification function Verify of Expression 13 may not necessarily be the challenge data $D_{CH}$. The message input may be a concatenation of other data known to both the authenticating device and the authentication target apparatus (e.g., the chip identifier $C_{ID}$) with the challenge data $D_{CH}$. Alternatively, the chip identifier $C_{ID}$ may be input as challenge data to the signature function Sign and the signature verification function Verify. In this case, although the response data always has the same value when transmitted from the same authentication target chip 210, the advantage of improving security by delaying the timing at which the allowance data and the authentication data are exposed can still be achieved.

3-5. Summary of Second Example

In the second example described above, the authentication target apparatus (authentication target chip) stores pre-set first allowance data (password hash value) used to determine whether a response to an authentication request received from the authentication apparatus (authentication chip) is allowed. The authentication target apparatus does not access authentication data (signing key) used for main authentication stored in the internal memory until valid second allowance data (password) is received from the authentication apparatus. Meanwhile, the authentication apparatus stores, in advance, restriction data (password original key) that serves as the basis for deriving the second allowance data in an internal memory, but reading of the restriction data from the memory is made possible only after the energized time of the authentication apparatus has reached a pre-set reference time. Therefore, even if an attacker attempts to perform semiconductor behavior analysis such as microprobing while operating the authentication target apparatus, allowance data and authentication data cannot be probed until the reference time has elapsed. In this way, by delaying the timing at which meaningful information is exposed in an information analysis type attack, it is possible to lower the probability of a successful attack within a realistic time constraint, and thus enhance resistance to attacks. Also, since such a delay does not rely on the number of variations in secret information, it is possible to avoid an increase in cost caused by an increase in the scale of non-volatile memory.

Furthermore, in the second example described above, the authentication target apparatus stores, in advance, the private key (signing key) of a public key encryption scheme used to generate the digital signature for the challenge data received from the authentication target apparatus. The authentication unit of the authentication apparatus performs authentication on the authentication target apparatus by performing verification on the digital signature received as response data from the authentication target apparatus in response to the authentication request, using the public key (chip verification key) corresponding to the private key and the challenge data. Therefore, authentication can performed on the authentication target apparatus by performing verification on the digital signature with use of a secure public key encryption algorithm. Even if the public key is leaked, as long as the private key is not leaked, an authentication target apparatus prepared by the attacker will not be able to impersonate a genuine authentication target apparatus.

Also, in the second example described above, the authentication unit of the authentication apparatus performs verification on the digital signature included in the authentication response only in the case where the authenticity of the public key has been confirmed based on the electronic certificate (chip certificate) received from the authentication target apparatus. Therefore, even if an authentication target apparatus prepared by an attacker provides its own public key to the authentication apparatus for fraudulent authentication, the authentication apparatus can be prevented from erroneously using the public key.

Note that in this specification, the expression "public key" simply means a key that is paired with a private key in a public key encryption scheme, and does not mean a key that is made public in a form accessible by any third party. In other words, the public key may actually be kept secret, and access to the public key may be restricted in various ways.

4. Third Example 4-1. Configuration Example of Authentication Chip

In the first example described above, only one instance of original key, which is the basis for deriving the common key or password, may be prepared for one pair of an authenticating device and an authentication target apparatus, whereas in the third example described in this section, a plurality of instances of original keys are prepared in advance. The original key used for authentication can be switched as time elapses.

Figure 11:
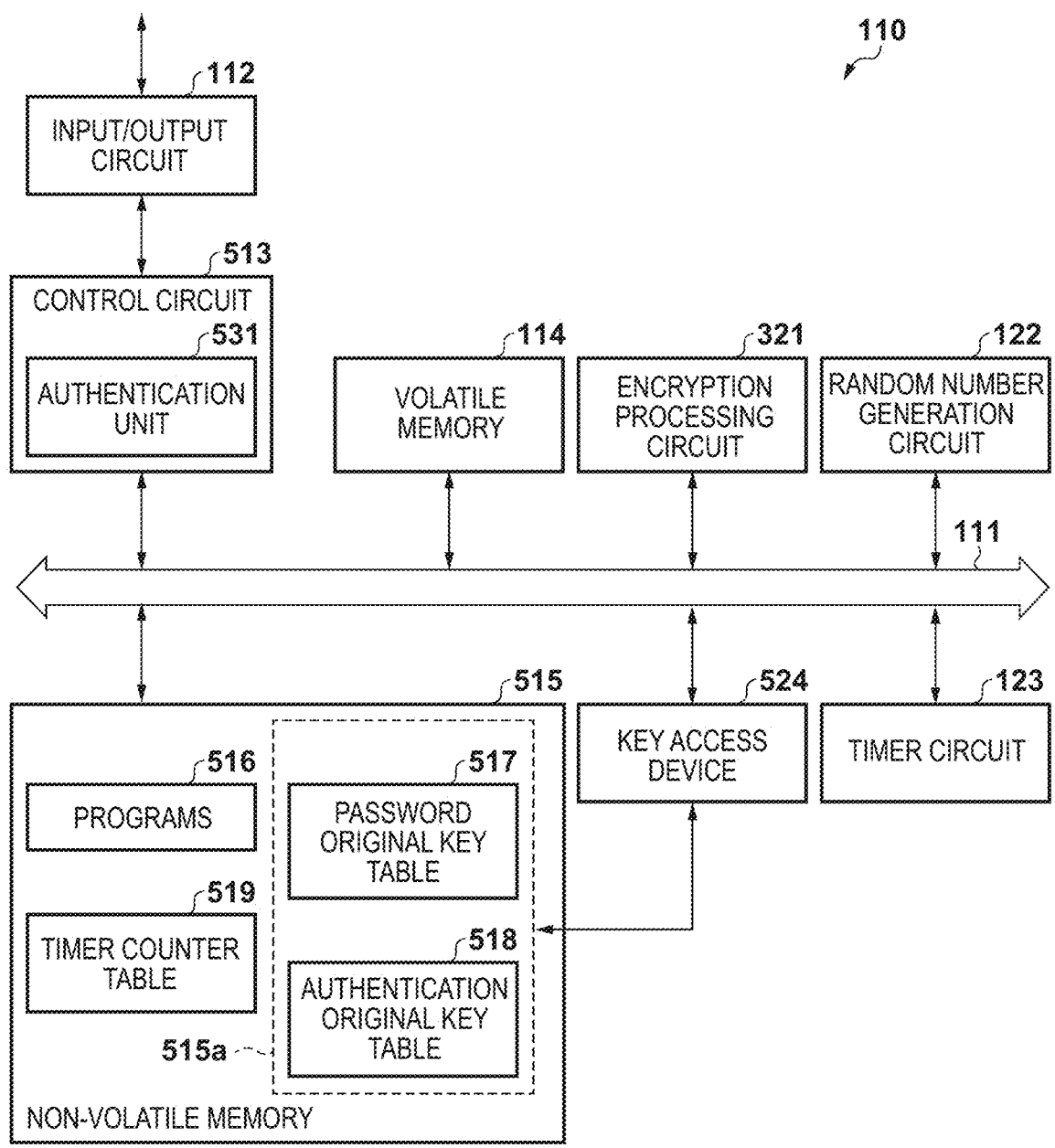
FIG. 11 is a block diagram showing an example of the configuration of an authentication chip according to a third example.

FIG. 11 is a block diagram showing an example of the configuration of the authentication chip 110 according to the third example. As shown in FIG. 11, the authentication chip 110 includes the internal bus 111, the input/output circuit 112, a control circuit 513, the volatile memory 114, a non-volatile memory 515, the encryption processing circuit 121, the random number generation circuit 122, the timer circuit 123, and a key access device 524.

The control circuit 513 controls communication with the authentication target apparatus. The control circuit 513 may be processing circuitry such as a CPU, a microcontroller, or a microprocessor, for example, and performs various types of processing in accordance with commands received from the control unit 107. The non-volatile memory 515 is a storage unit that may include a semiconductor memory or a hard disk, for example.

In the present example, the non-volatile memory 515 stores one or more computer programs 516, a password original key table 517, an authentication original key table 518, and a timer counter table 519. The password original key table 517 holds N (N is an integer of 2 or more) different password original keys $K_{PO\_k}$ (k=1, ..., N) as an example of the above-mentioned restriction data. The N password original keys $K_{PO\_k}$ have original values respectively corresponding to N password hash values $P_{H\_k'}$ stored in a below-described password hash table 617 of the authentication target chip 210. The authentication original key table 518 holds N different authentication original keys $K_{AO\_k}$ (k=1, ..., N), each of which serves as a basis for deriving an authentication key used for challenge-response authentication. The authentication original keys $K_{AO\_k}$ have original values respectively corresponding to N authentication keys $K_{A\_k'}$ stored in a below-described authentication key table 618 of the authentication target chip 210. As shown by dashed lines in FIG. 11, the password original key table 517 and the authentication original key table 518 are stored in a restricted storage area 515a of the non-volatile memory 515. Access to the restricted storage area 515a (e.g., the reading of data) can only be performed via the key access device 524.

The timer counter table 519 holds N counter values for monitoring the passage of time while the authentication chip 110 is energized. Specifically, in the present example, N different reference times are pre-set as initial values of N timer counters. These counter values are all counted down while the authentication chip 110 is energized, and reach zero at mutually different timings.

Although not shown in FIG. 11, the authentication chip 110 may further include a power supply circuit. The power supply circuit supplies power from an external power source to units of the authentication chip 110. The non-volatile memory 515 can maintain the above-mentioned programs and data even while the authentication chip 110 is not energized. The key access device 524 is a device that restricts access to the restricted storage area 515a. When the energized time of the authentication chip 110 reaches the reference time of the i-th timer counter (i is an integer greater than or equal to 1 and less than or equal to N), the key access device 524 enables the i-th password original key $K_{PO\_i}$ and authentication original key $K_{AO\_i}$ to be read out from the restricted storage area 515a.

In the present example, the control circuit 513 functions as the authentication unit 531 that performs authentication processing for performing authentication on the authentication target chip 210, in cooperation with the encryption processing circuit 121, the random number generation circuit 122, and the timer circuit 123. The flow of authentication processing will be described in detail below.

4-2. Configuration Example of Authentication Target Chip

Figure 12:
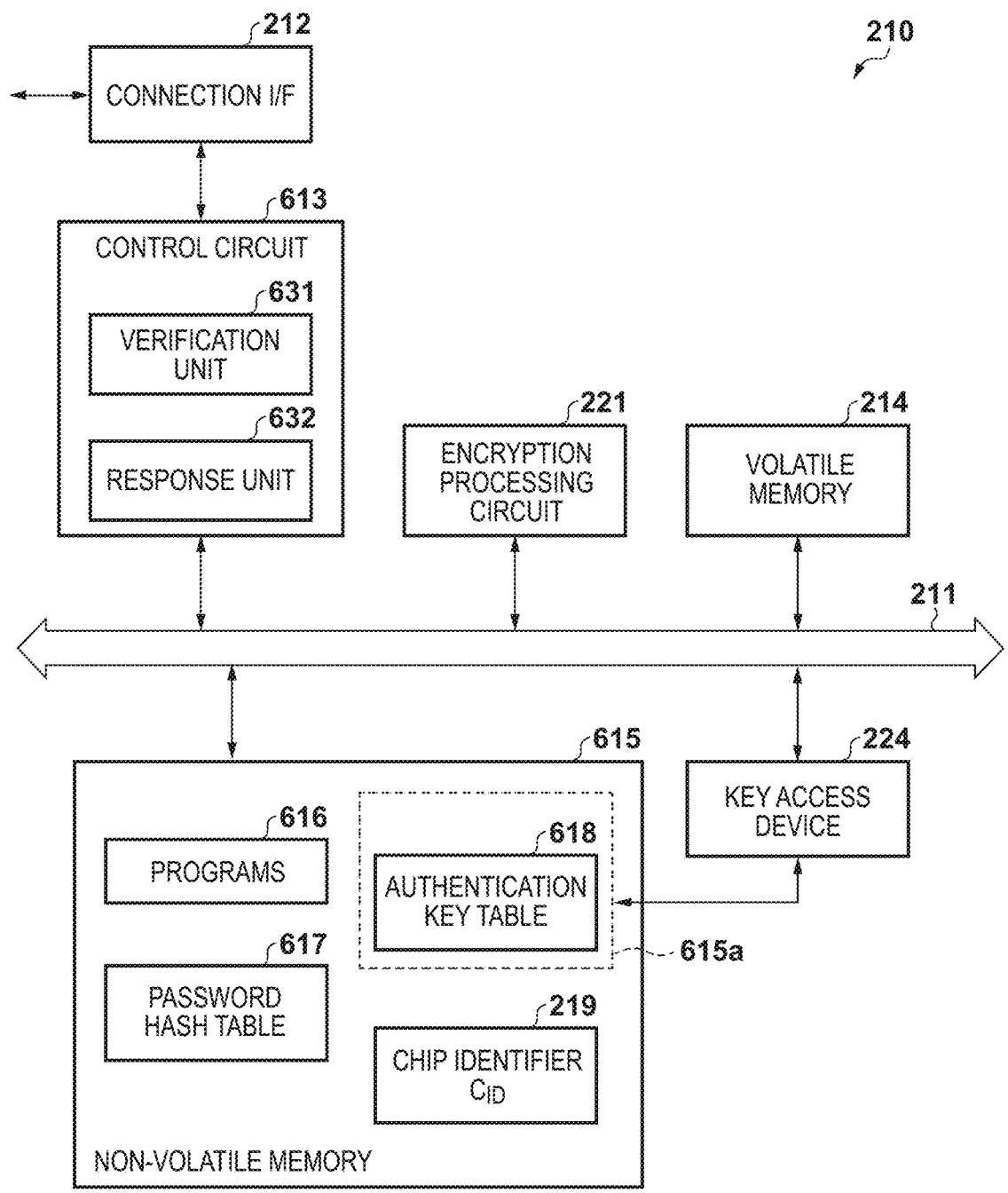
FIG. 12 is a block diagram showing an example of the configuration of an authentication target chip according to the third example.

FIG. 12 is a block diagram showing an example of the configuration of the authentication target chip 210 according to the third example. As shown in FIG. 12, the authentication target chip 210 includes the internal bus 211, the connection I/F 212, a control circuit 613, the volatile memory 214, a non-volatile memory 615, the encryption processing circuit 221, and the key access device 224.

The control circuit 613 may be processing circuitry such as a CPU, a microcontroller, or a microprocessor, for example. The non-volatile memory 615 is a storage unit including a semiconductor memory, for example.

In the present example, the non-volatile memory 615 stores one or more computer programs 616, a password hash table 617, an authentication key table 618, and the chip identifier ($C_{ID}$) 219. The password hash table 617 holds N different password hash values $P_{H\_k'}$ (k=1, ..., N) as an example of the first allowance data described above. Each of the password hash values $P_{H\_k'}$ is a hash value used to determine whether a response to an authentication request received from the authentication chip 110 is allowed. The authentication key table 618 holds N different authentication keys $K_{A\_k'}$ (k=1, ..., N). Each of the authentication keys $K_A$ K' is a first authentication key used to generate response data from challenge data received together with an authentication request from the authentication chip 110. As indicated by dashed lines in FIG. 12, the authentication key table 618 is stored in the restricted storage area 615a of the non-volatile memory 615. Access to the restricted storage area 615a (e.g., the reading of data) can only be performed via the key access device 224. In the case where verification of the i-th password $PW_{\_k}$ by the below-described verification unit 631 is successful, the key access device 224 allows the i-th authentication key $K_{A\_K'}$ to be read from the authentication key table 618.

In the present example, the control circuit 613 functions as a verification unit 631 and a response unit 632. The verification unit 631 verifies the i-th password $PW_{-i}$ received from the authentication chip 110 via the connection I/F 212, using the i-th password hash value $P_{H\_i'}$ read from the non-volatile memory 615. The response unit 632 performs response processing for challenge-response type authentication in response to a control command received from the authentication chip 110. The processing executed by the verification unit 631 and the response unit 632 will be described in detail below.

Note that circuits shown separately from the control circuit in FIGS. 11 and 12 may each be implemented as a software module executed by the control circuit instead of being implemented as an independent circuit. Furthermore, the modules described as functions of the control circuit may each be implemented as an independent circuit separate from the control circuit. Also, although FIGS. 11 and 12 each show one non-volatile memory, the shown memories may each actually be a collection of memory circuits.

4-3. Authentication Data Generation and Storage in Memory

Figure 13:
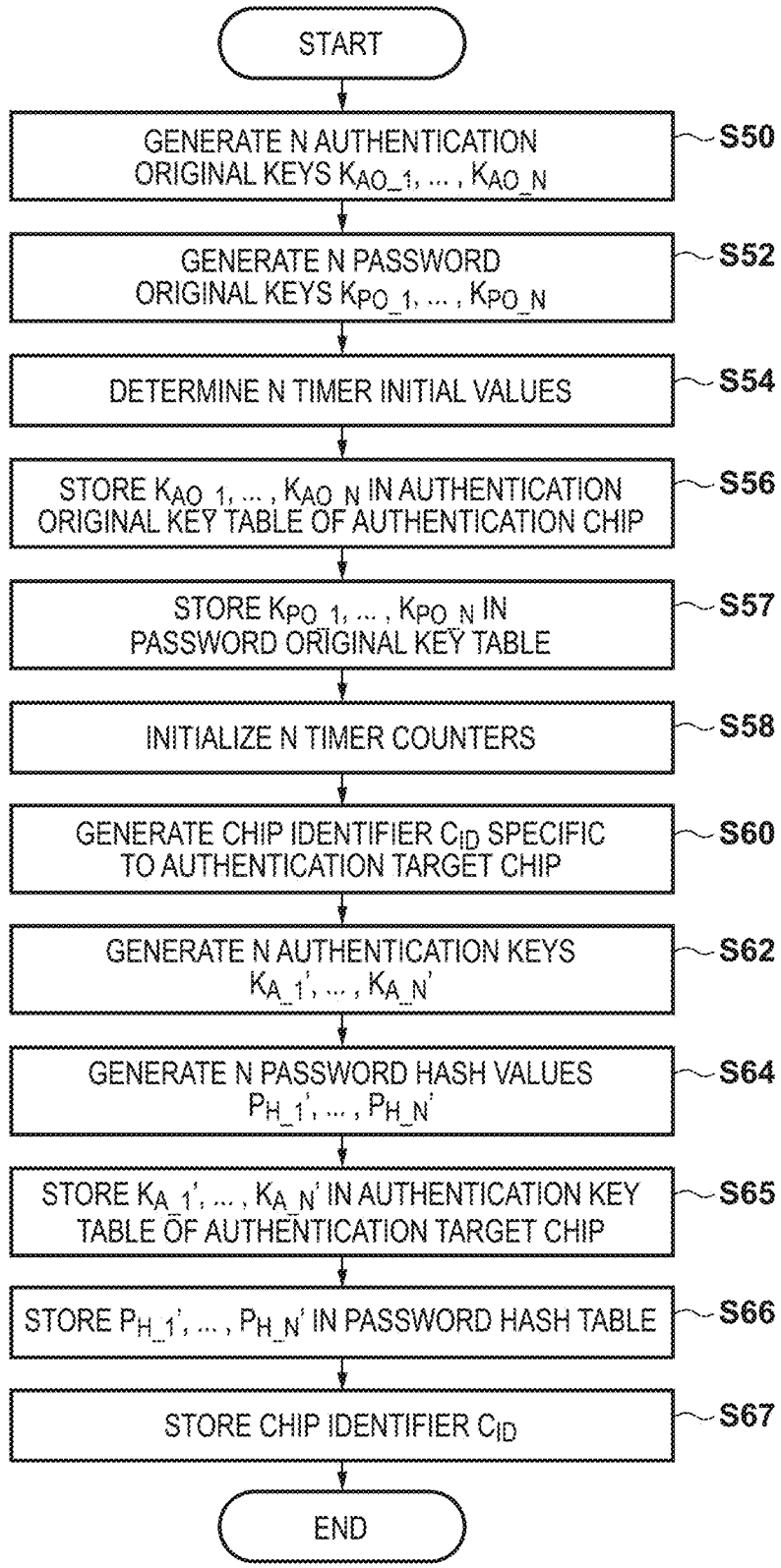
FIG. 13 is a flowchart showing an example of the flow of data generation processing for generating data to be stored in the memories of the authentication chip and the authentication target chip according to the third example.

FIG. 13 is a flowchart showing an example of the flow of data generation processing for generating data to be stored in the non-volatile memory 515 of the authentication chip 110 and the non-volatile memory 615 of the authentication target chip 210. The data generation processing in FIG. 13 may be executed, for example, in a factory using a device different from the image-forming apparatus 100 and the process cartridge 200.

As shown in FIG. 13, first, in step S50, N authentication original keys $K_{AO\_1}, \ldots, K_{AO\_N}$ are generated. Next, in step S52, N password original keys $K_{PO\_1}, \ldots, K_{PO\_N}$ are generated. Then, in step S54, N different initial values of the countdown timer, that is to say N reference times, are determined. Next, in step S56, the N authentication original keys $K_{AO\_1}, \ldots, K_{AO\_N}$ are stored in the authentication original key table 518 of the authentication chip 110. Next, in step S57, the N password original keys $K_{PO\_1}, \ldots, K_{PO\_N}$ are stored in the password original key table 517 of the authentication chip 110. Next, in step S58, N counter values $C_{T\_1}, \ldots, C_{T\_N}$ of the timer counter table 519 of the authentication chip 110 are initialized to the initial values determined in step S54. Note that each entry in the tables described in the present example may be configured by a pair of a value and an index that identifies the entry.

Next, in step S60, an identifier (chip identifier) $C_{ID}$ specific to the authentication target chip 210 is generated. Next, in step S62, N authentication keys $K_{A\_1'}, \ldots, K_{A\_N'}$ are derived based on the chip identifier $C_{ID}$ and the N authentication original keys $K_{AO\_1}, \ldots, K_{AO\_N}$. Each of the authentication keys $K_{A\_K'}$ can be generated based on the chip identifier $C_{ID}$ and the corresponding authentication original key $K_{AO\_k}$ according to Expression 1 or Expression 2 described above.

Next, in step S64, N password hash values $P_{H\_1'}, \ldots, P_{H\_N'}$ are generated. Each of the password hash values $P_{H\_k}$ can be generated by deriving a password $PW_{-k}$ from the corresponding password original key $K_{PO\_k}$ and further deriving a hash value $P_{H\_k'}$ from the derived password $PW_{-k}$. For example, the password $PW_{-k}$ can be derived according to Expression 3 or Expression 4 mentioned above, and the hash value $P_{H\_k'}$ can be derived according to Expression 5 or Expression 6 mentioned above.

Next, in step S65, the N authentication keys $K_{A\_1'}, \ldots, K_{A\_N'}$ are stored in the authentication key table 618 of the authentication target chip 210. Next, in step S66, the N password hash values $P_{H\_1'}, \ldots, P_{H\_N'}$ are stored in the password hash table 617 of the authentication target chip 210. Next, in step S67, the chip identifier $C_{ID}$ is stored in the non-volatile memory 615 of the authentication target chip 210.

Note that if a plurality of process cartridges are manufactured, steps S60 to S67 are iterated multiple times. In each of these iterations, the chip identifier $C_{ID}$ is different for each manufactured process cartridge. Furthermore, if a plurality of image-forming apparatuses are manufactured, steps S50 to S67 may be iterated multiple times. The data generation processing in FIG. 13 then ends.

4-4. Cartridge Authentication

Figure 14:
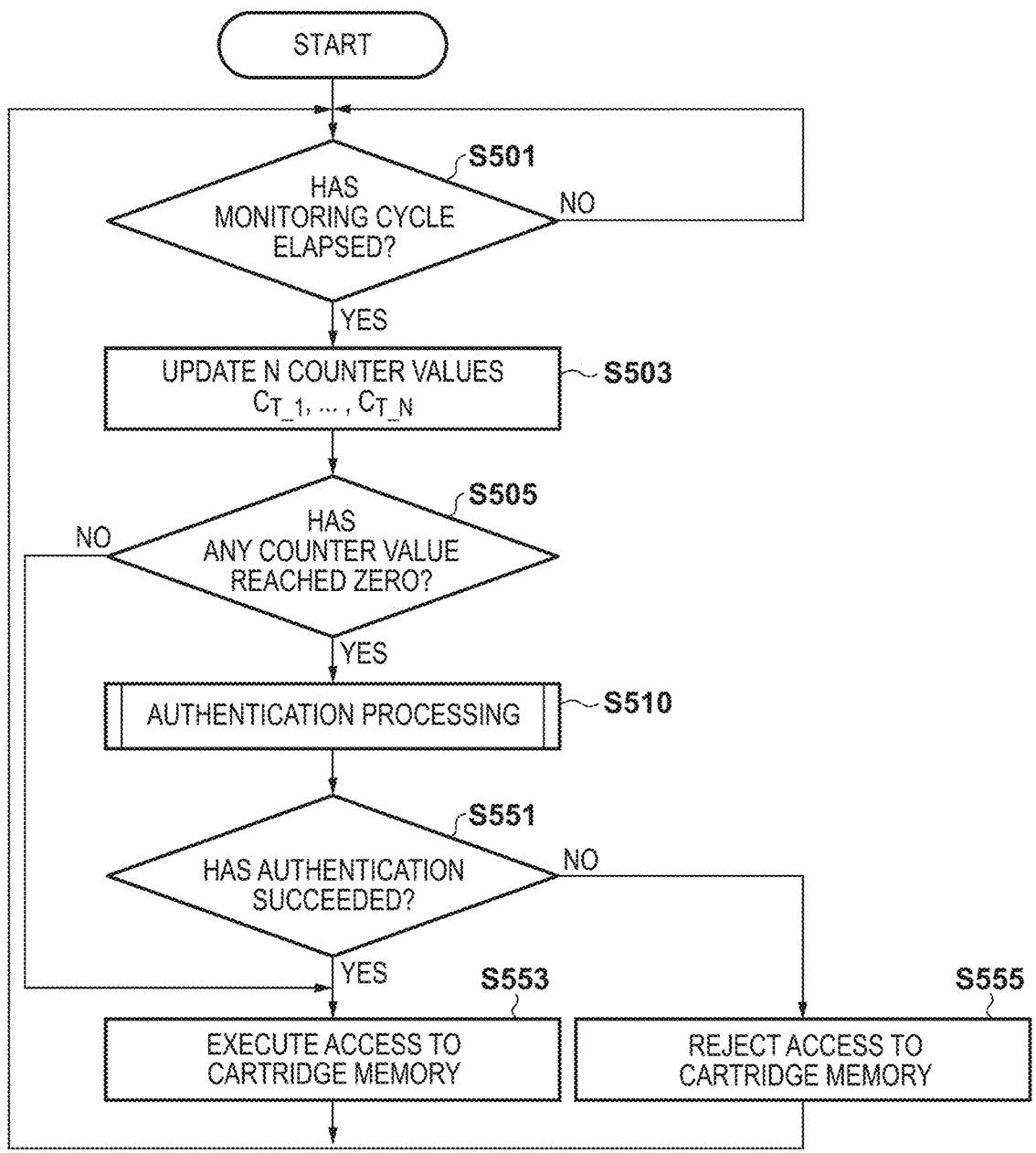
FIG. 14 is a flowchart showing an example of the overall processing flow in the authentication system according to the third example.

FIG. 14 is a flowchart illustrating an example of the overall processing flow in the authentication system according to the present example.

When triggered by the sensor 105 detecting that the process cartridge 200 is mounted to the image-forming apparatus 100, the control unit 107 transmits a control command to the authentication chip 110 to instruct the start of authentication, and thus the processing shown in FIG. 14 is started, for example. Note that the trigger for starting authentication may not be detection of mounting of the process cartridge 200, and instead may be detection of a user operation requesting start of authentication via the user interface of the image-forming apparatus 100, for example.

As shown in FIG. 14, first, in step S501, the authentication unit 131 of the authentication chip 110 uses the timer circuit 123 to wait until a predetermined monitoring cycle has elapsed. When one monitoring cycle has elapsed, in step S503, the authentication unit 131 subtracts the length of the monitoring cycle from the N counter values $C_{T\_1}, \ldots, C_{T\_N}$ of the timer counter table 519 (i.e., performs countdown). Next, in step S505, the authentication unit 131 determines whether or not any of the counter values has reached zero, that is to say, whether or not the energized time of the authentication chip 110 has reached any of the reference times. If the energized time of the authentication chip 110 has reached any of the reference times, the authentication processing of step S510 is executed. On the other hand, if the energized time of the authentication chip 110 has not reached any of the reference times, the authentication processing of S510 is skipped.

Figure 15:
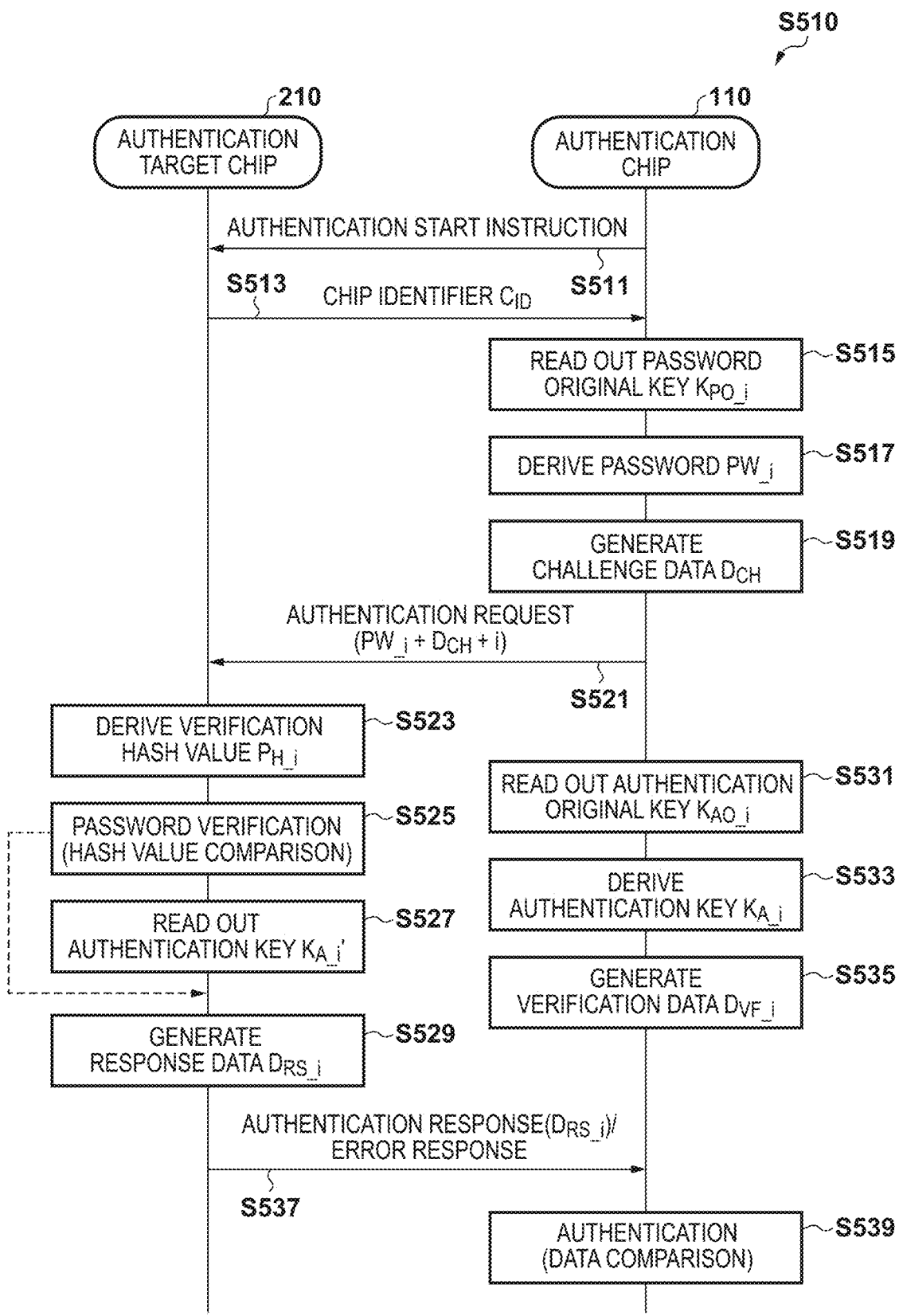
FIG. 15 is a sequence diagram showing an example of the detailed flow of authentication processing according to the third example.

FIG. 15 is a sequence diagram showing an example of the detailed flow of the authentication processing executed in step S510 of FIG. 14. Here, assume that the authentication processing of S510 is executed as a result of the i-th counter value $C_{T\_i}$ of the timer counter table 519 reaching zero.

First, in step S511, the authentication unit 531 transmits an authentication start instruction to the authentication target chip 210. In step S513, in response to the request from the authentication unit 531, the response unit 632 of the authentication target chip 210 reads the chip identifier $C_{ID}$ from the non-volatile memory 615 and transmits the read information to the authentication chip 110. The input/output circuit 112 of the authentication chip 110 receives the chip identifier $C_{ID}$ transmitted from the authentication target chip 210.

Next, in step S515, the authentication unit 531 reads the i-th password original key $K_{PO\_i}$ from the password original key table 517 via the key access device 524. Next, in step S517, the authentication unit 531 derives a password $PW_{-i}$ based on the read password original key $K_{PO\_i}$ and the received chip identifier $C_{ID}$. The password $PW_{-i}$ can be derived using the encryption processing circuit 121 according to Expression 3 or Expression 4 described above, for example. Next, in step S519, the authentication unit 531 causes the random number generation circuit 122 to generate a random number $D_{CH}$ as challenge data.

Next, in step S521, the authentication unit 531 transmits an authentication request, which includes the password $PW_{-i}$ derived in step S517, the challenge data $D_{CH}$ generated in step S519, and the index i, to the authentication target chip 210 via the input/output circuit 112. The connection I/F 212 of the authentication target chip 210 receives the authentication request transmitted from the authentication chip 110.

The verification unit 631 of the authentication target chip 210 determines whether or not to allow a response to the authentication request received from the authentication chip 110, by verifying the validity of the password $PW_{-i}$. Specifically, in step S523, the verification unit 631 derives a verification hash value $P_{H\_i}$ based on the password $PW_{-i}$ received together with the authentication request. Similarly to the password hash value $P_{H\_i'}$, the verification hash value $P_{H\_i}$ can be derived according to Expression 5 or Expression 6 mentioned above. Next, in step S525, the verification unit 631 verifies the validity of the password $PW_{-i}$ by comparing the derived verification hash value $P_{H\_i}$ with the i-th password hash value $P_{H\_i'}$ read from the non-volatile memory 615. If the two hash values match each other, it is determined that the password verification is successful, and reading of the i-th authentication key $K_{A\_i'}$ is made possible from the restricted storage area 615a via the key access device 224.

In step S527, the response unit 632 of the authentication target chip 210 reads the i-th authentication key $K_{A\_i'}$ from the authentication key table 618 via the key access device 224. Next, in step S529, the response unit 632 causes the encryption processing circuit 221 to generate response data $D_{RS\_i}$ based on the challenge data $D_{CH}$ received from the authentication chip 110 and the authentication key $K_{A\_i'}$. For example, the response data $D_{RS\_i}$ can be generated according to Expression 7, Expression 8, or Expression 9 described above.

Then, in step S537, the response unit 632 returns the response data $D_{RS\_i}$ to the authentication chip 110 as a response to the authentication request. Note that if the password verification in step S525 fails, the response unit 632 returns an error response to the authentication chip 110 without reading the authentication key $K_{A\_i'}$. In FIG. 15, the processing path in which reading of the authentication key $K_{A\_i'}$ is skipped is shown by a dashed line.

In the meantime, the authentication unit 531 of the authentication chip 110 that transmitted the authentication request in step S521 reads, in step S531, the i-th authentication original key $K_{AO\_i}$ from the authentication original key table 518 via the key access device 524. Next, in step S533, the authentication unit 531 causes the encryption processing circuit 121 to derive the authentication key $K_{A\_i}$ based on the chip identifier $C_{ID}$ received from the authentication target chip 210 and the read authentication original key $K_{AO\_i}$. Similarly to the authentication key $K_{A\_i'}$, the authentication key $K_{A\_i}$ can be derived according to Expression 1 or Expression 2 described above. Next, in S535, the authentication unit 531 generates verification data $D_{VF\_i}$ based on the challenge data $D_{CH}$ transmitted to the authentication target chip 210 and the authentication key $K_{A\_i}$ generated in step S533. Similarly to the response data $D_{RS\_i}$, the verification data $D_{VF\_i}$ can be generated according to Expression 7, Expression 8, or Expression 9 described above.

In step S537, the input/output circuit 112 of the authentication chip 110 receives the authentication response transmitted from the authentication target chip 210. If the password verification performed in the authentication target chip 210 has been successful, the authentication response includes the response data $D_{RS\_i}$. If the password verification fails in the authentication target chip 210, the authentication response is an error response. The authentication unit 531 performs authentication on the authentication target chip 210 by performing verification on the response data $D_{RS\_i}$ included in the authentication response.

Specifically, in step S539, the authentication unit 531 verifies the validity of the response data $D_{RS\_i}$ by comparing the response data $D_{RS\_i}$ included in the authentication response with the verification data $D_{VF\_i}$ generated using the challenge data $D_{CH}$ and the authentication key $K_{A\_i}$. If the response data $D_{RS\_i}$ matches the verification data $D_{VF\_i}$, the authentication unit 531 determines that the authentication of the process cartridge 200 is successful. If the response data $D_{RS\_i}$ does not match the verification data $D_{VF\_i}$, or if the authentication response is an error response, the authentication unit 531 determines that the authentication of the process cartridge 200 is unsuccessful. The authentication unit 531 reports the authentication result determined in step S539 to the control unit 107.

Returning to FIG. 14, the subsequent processing branches depending on whether or not the authentication of the process cartridge 200 has been successful or failed in step S551. If the authentication has been successful, the control unit 107 accesses the memory of the process cartridge 200 in step S553. For example, the control unit 107 may read control parameters (not shown in FIG. 12) related to operating conditions stored in the memory of the process cartridge 200 and use the control parameters for subsequent control. Even in the case where it is determined in step S505 that the energized time of the authentication chip 110 has not reached any of the reference times, the memory of the process cartridge 200 may be accessed.

If the authentication has failed, in step S555, the control unit 107 may warn the user that the process cartridge 200 is not a genuine product. The warning here may be performed using any method, such as displaying a warning message on the display of the image-forming apparatus 100, lighting a warning light, or outputting an alarm sound.

4-5. Modified Example

Up to this point, an example has been described in which when the energized time of the authentication chip 110 reaches the i-th reference time, password verification is performed one time on the i-th password $PW_{-i}$ derived based on the i-th password original key $K_{PO\_i}$ (the one made accessible last). However, the present example is not limited to such an example. In a modified example, a configuration is possible in which when the energized time of the authentication apparatus reaches the i-th reference time, i passwords derived based on the first to i-th password original keys $K_{PO\_1}, \ldots, K_{PO\_i}$ are transmitted to authentication target chip 210 for password verification. Note that the indexes are assigned in order of shortest reference time. The verification unit 631 of the authentication target chip 210 verifies the validity of the i passwords $PW_{-1}, \ldots, PW_{-i}$ using the corresponding i password hash values $P_{H\_1'}, \ldots, P_{H\_i'}$. Then, only if verification is successful for all of the i passwords, the verification unit 631 reads the i-th authentication key $K_{A\_i'}$ from the authentication key table 618 and uses the read authentication key to respond to the authentication request from the authentication chip 110. According to this configuration, the number of passwords verified in password verification increases as time passes, thus making it possible to further strengthen resistance to information analysis type attacks.

4-6. Summary of Third Example

In the third example described above, the authentication target apparatus (authentication target chip) stores, in a memory in advance, N hash values (password hash values) of first allowance data used to determine whether a response to an authentication request received from the authentication apparatus (authentication chip) is allowed. The authentication apparatus (authentication chip) stores, in a memory in advance, restriction data that includes N original values (password original keys) respectively corresponding to the N hash values of the first allowance data. Also, N different reference times are pre-set in the authentication apparatus. Then, when the energized time of the authentication apparatus reaches the i-th reference time, the i-th original value of the restriction data is read from the memory, and the i-th value of second allowance data (password) derived based on the i-th original value is transmitted to the authentication target apparatus. After the i-th value of the second allowance data is successfully verified using the corresponding i-th hash value of the first allowance data, the authentication target apparatus reads, from the memory, the i-th first authentication key from among N first authentication keys stored in advance for main authentication. Therefore, in the present example as well, by delaying the timing at which meaningful information is exposed in an information analysis type attack, it is possible to lower the probability of a successful attack within a realistic time constraint.

Furthermore, in the third example described above, password verification is iterated as time passes, and the password value changes for each iteration of verification. Furthermore, the authentication key used for challenge-response authentication also changes for each iteration of verification. This makes it even more difficult to analyze information that may include a password and an authentication key, thus further enhancing resistance to information analysis-type attacks. Moreover, the attacker will require more time to perform analysis to get to know all of the passwords or all of the authentication keys.

5. Fourth Example

5-1. Configuration Example of Authentication Chip

In the first to third examples described above, if the same authentication target apparatus is connected to the authentication apparatus multiple times, the authentication apparatus performs authentication on the authentication target apparatus each time the connection is made. In contrast, in a fourth example described in this section, a mechanism is adopted in which authentication is not re-executed for an authentication target apparatus that has previously been authenticated.

Figure 16:
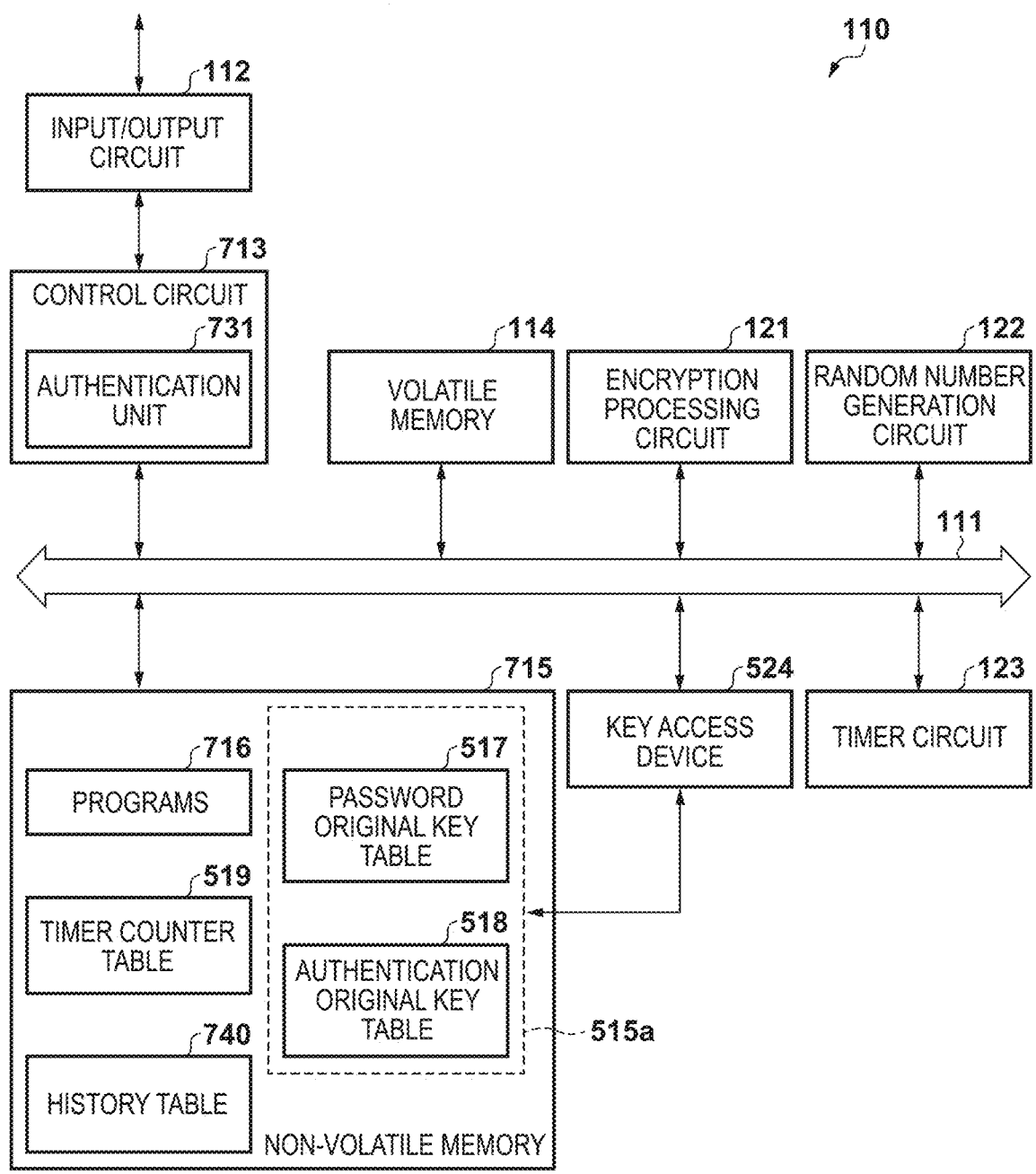
FIG. 16 is a block diagram showing an example of the configuration of an authentication chip according to a fourth example.

FIG. 16 is a block diagram showing an example of the configuration of the authentication chip 110 according to the fourth example. As shown in FIG. 16, the authentication chip 110 includes the internal bus 111, the input/output circuit 112, a control circuit 713, the volatile memory 114, a non-volatile memory 715, the encryption processing circuit 121, the random number generation circuit 122, the timer circuit 123, and a key access device 524.

The control circuit 713 controls communication with the authentication target apparatus. The control circuit 713 may be processing circuitry such as a CPU, a microcontroller, or a microprocessor, for example, and performs various types of processing in accordance with commands received from the control unit 107. The non-volatile memory 715 is a storage unit that may include a semiconductor memory or a hard disk, for example.

In the present example, the non-volatile memory 715 stores one or more computer programs 716, the password original key table 517, the authentication original key table 518, the timer counter table 519, and a history table 740.

The history table 740 stores chip identifiers $C_{ID}$ of authentication target chips 210 that were successfully authenticated based on authentication responses. The history table 740 may store a list of the chip identifiers of one or more authentication target chips that have previously been successfully authenticated, or may store the chip identifiers of one or more authentication target chips that have previously attempted to be authenticated in association with authentication results (success or failure).

In the present example, the control circuit 713 functions as an authentication unit 731 that performs authentication processing for performing authentication on the authentication target chip 210, in cooperation with the encryption processing circuit 121, the random number generation circuit 122, and the timer circuit 123. Upon receiving a chip identifier $C_{ID}$ from an authentication target chip 210 that has been connected to the authentication chip 110, the authentication unit 731 determines whether or not the chip identifier $C_{ID}$ exists in the history table 740 (whether it has been registered as a history record). If the chip identifier $C_{ID}$ exists in the history table 740, the authentication unit 731 determines that the connected authentication target chip 210 has been authenticated, and does not transmit an authentication request to the connected authentication target chip 210. If the authentication target chip 210 was successfully authenticated in the past authentication, reading of further data (e.g., control parameters indicating optimal operating conditions) is made possible from the memory of the authentication target chip 210. If the authentication of the authentication target chip 210 failed in past authentication, connection with the authentication target chip 210 may be rejected, or access to the memory of the authentication target chip 210 may be prohibited. The flow of such processing will be described in detail below.

The configuration of the authentication target chip 210 according to the present example may be similar to the configuration described using FIG. 12 in connection with the third example. Furthermore, the flow of processing for storing data generated in advance at the product manufacturing stage in the memories of the authentication chip 110 and the authentication target chip 210 may be similar to the flow described using FIG. 13 in connection with the third example. However, in the present example, the history table 740 (which is empty at the time of manufacture) is additionally generated in the non-volatile memory 715 of the authentication chip 110.

5-2. Cartridge Authentication

Figure 17:
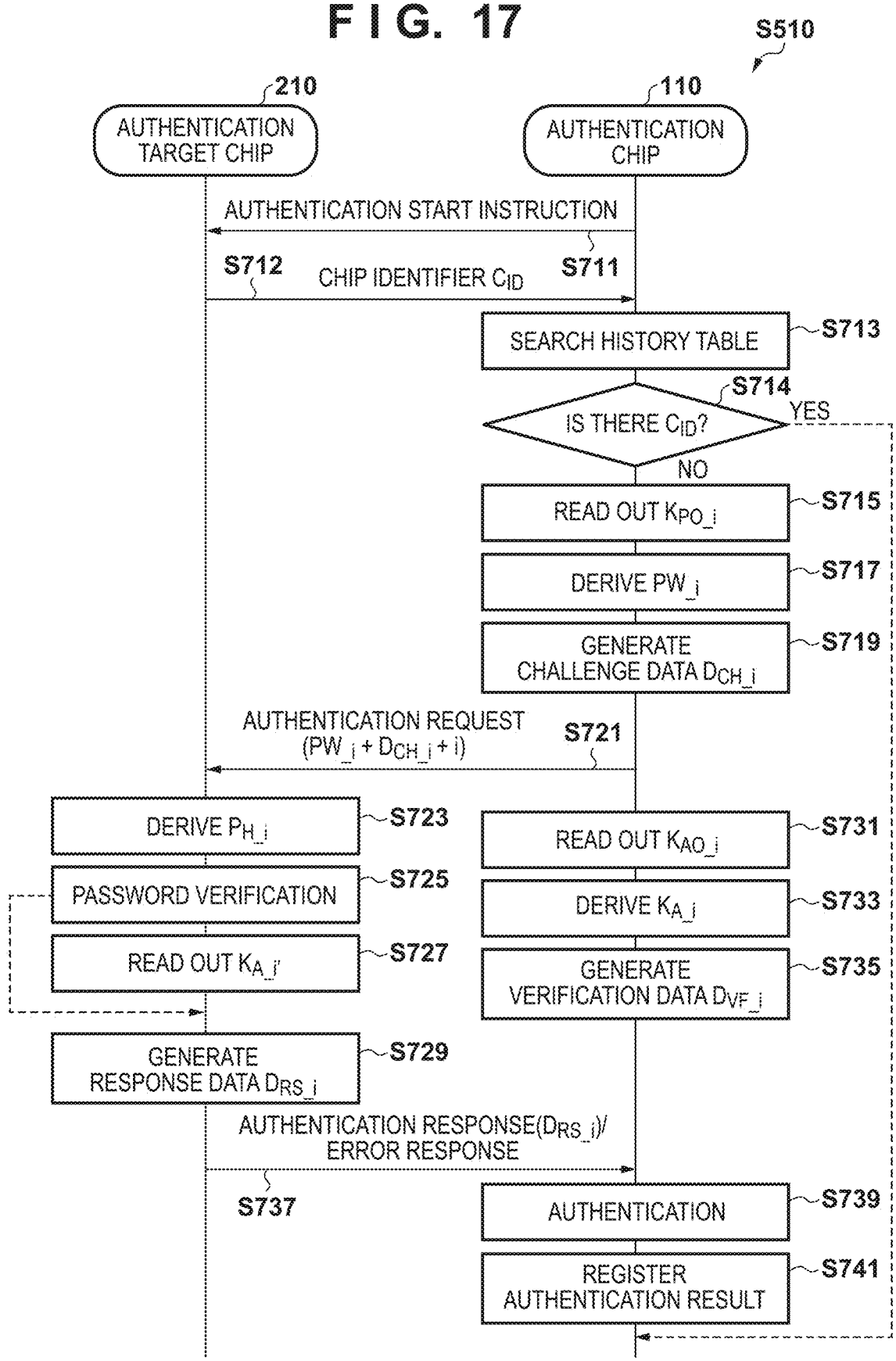
FIG. 17 is a sequence diagram showing an example of the detailed flow of authentication processing according to the fourth example.

The overall processing flow in the authentication system according to the present example may be similar to the flow in the third example described using FIG. 14. FIG. 17 is a sequence diagram showing an example of the detailed flow of the authentication processing executed in step S510 of FIG. 14. Here, assume that the authentication processing of S510 is executed as a result of the i-th counter value $C_{T\_i}$ of the timer counter table 519 reaching zero.

First, in step S711, the authentication unit 731 transmits an authentication start instruction to the authentication target chip 210. In S712, in response to the request from the authentication unit 731, the response unit 632 of the authentication target chip 210 reads the chip identifier $C_{ID}$ from the non-volatile memory 615 and transmits the read information to the authentication chip 110. The input/output circuit 112 of the authentication chip 110 receives the chip identifier $C_{ID}$ transmitted from the authentication target chip 210.

Next, in step S713, the authentication unit 731 searches the history table 740 and determines whether or not the chip identifier $C_{ID}$ received from the authentication target chip 210 exists. In step S714, the subsequent processing branches depending on whether or not the chip identifier $C_{ID}$ exists in the history table 740. If the chip identifier $C_{ID}$ does not exist in the history table 740 (S714: NO), password verification and challenge-response authentication are performed in steps S715 to S739. Steps S715 to S739 may be processing steps similar to S515 to S539 described using FIG. 15 in connection with the third example. When the authentication performed on the authentication target chip 210 in step S739 is complete, the authentication unit 731 registers the authentication result in the history table 740 in step S741 (e.g., a record indicating the chip identifier $C_{ID}$ of the authentication target chip 210 that has been successfully authenticated is added to the history table 740).

If the chip identifier $C_{ID}$ exists in the history table 740 (S714: YES), password verification and challenge-response authentication are skipped. In this case, the authentication unit 731 reports the past authentication result indicated by the history table 740 to the control unit 107. If authentication has already been successful in the past, the control unit 107 can immediately access the memory of the process cartridge 200.

5-3. Summary of Fourth Example

In the fourth example described above, the authentication apparatus (authentication chip) has a table (history table) that stores identifiers of authentication target apparatuses that have been successfully authenticated. If an identifier received from a newly connected authentication target apparatus exists in the table, the authentication unit of the authenticating device determines that the authentication target apparatus has been authenticated, and does not transmit an authentication request to the authentication target apparatus. Therefore, data required to authenticate the same authentication target apparatus does not flow through the wiring on the chip and the communication line between chips many times, thus making it difficult to statistically analyze the data flowing through such lines. This further improves resistance to information analysis type attacks such as microprobing. Even if an identifier registered in the table were to be leaked, that identifier would be valid only for a specific authentication target apparatus. Therefore, an attack on the history table is not useful for the fraudulent purpose of attempting to imitate an authentication target apparatus.

Note that the various examples and modified examples described in this specification may be combined with each other in any manner. For example, the history table described in the fourth example may be employed in the first example or the second example. In general, advantages described in connection with one example may also be achieved in other examples having common features.

6. Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2023-090207, filed on May 31, 2023 which is hereby incorporated by reference herein in its entirety.

What is claimed is:

1. An authentication apparatus that performs authentication on an authentication target apparatus that includes pre-stored first allowance data used to determine whether a response to an authentication request received from the authentication apparatus is allowed, a pre-stored identifier specific to the authentication target apparatus, and a pre-stored first authentication key derived based on the identifier, the first authentication key being used to generate response data from challenge data received together with the authentication request, the authentication apparatus comprising:

timer circuitry configured to measure a time for which the authentication apparatus is energized;

a memory storing restriction data that becomes readable after the time measured by the timer circuitry reaches a pre-set reference time;

communication circuitry configured to:
receive the identifier from the authentication target apparatus;
transmit challenge data together with the authentication request to the authentication target apparatus; and transmit, to the authentication target apparatus, second allowance data derived based on the restriction data read from the memory and the identifier received from the authentication target apparatus, the second allowance data being subjected to verification by the authentication target apparatus using the first allowance data; and receive an authentication response including the response data generated by the authentication target apparatus using the first authentication key;

processing circuitry configured to:

derive a second authentication key based on the identifier received from the authentication target apparatus; and perform authentication on the authentication target apparatus by verifying the response data included in the authentication response using the challenge data and a second authentication key derived based on the identifier received from the authentication target apparatus when the verification performed on the second allowance data by the authentication target apparatus with use of the first allowance data is successful.

2. The authentication apparatus according to claim 1, wherein the first authentication key and the second authentication key are used as a common key in a common key encryption scheme.

3. The authentication apparatus according to claim 2, wherein the first authentication key and the second authentication key are derived by inputting input data that is based on a common original key and the identifier to a cryptographic hash function.

4. The authentication apparatus according to claim 2, wherein the first authentication key and the second authentication key are derived by encrypting the identifier using a common original key as an encryption key.

5. The authentication apparatus according to claim 1, wherein the authentication target apparatus includes a pre-stored private key of a public key encryption scheme, the private key being used to generate a digital signature for challenge data received together with the authentication request from the authentication apparatus, the communication circuitry is configured to transmit the challenge data together with the authentication request to the authentication target apparatus, and receive the authentication response that includes the digital signature and is transmitted from the authentication target apparatus in response to the authentication request, and the processing circuitry is configured to perform authentication on the authentication target apparatus by performing verification on the digital signature included in the authentication response using a public key corresponding to the private key and the challenge data transmitted to the authentication target apparatus.

6. The authentication apparatus according to claim 5, wherein the authentication target apparatus includes pre-stored public key corresponding to the private key and an electronic certificate certifying authenticity of the public key, the communication circuitry is configured to receive the public key and the electronic certificate from the authentication target apparatus, and the processing circuitry is configured to perform verification on the digital signature included in the authentication response using the public key in a case where authenticity of the public key has been confirmed based on the electronic certificate received from the authentication target apparatus.

7. The authentication apparatus according to claim 1, wherein the memory has a table to store an identifier of a successfully authenticated apparatus, and in a case where an identifier received by the communication circuitry from the authentication target apparatus connected to the authentication apparatus exists in the table, the processing circuitry is configured to determine that the connected authentication target apparatus has been successfully authenticated without transmitting an authentication request to that authentication target apparatus.

8. The authentication apparatus according to claim 1, wherein the memory further stores a counter value for monitoring passage of time for which the authentication apparatus is energized.

9. The authentication apparatus according to claim 8, wherein the memory is a non-volatile memory.

10. The authentication apparatus according to claim 1, wherein the first allowance data includes N (N being an integer of 2 or more) hash values used to determine whether a response to the authentication request is allowed, the restriction data includes N original values respectively corresponding to the N hash values, N different reference times are pre-set, and in a case where the time measured by the timer circuitry reaches an i-th (i being an integer greater than or equal to 1 and less than or equal to N) reference time, the communication circuitry is configured to transmit an i-th value of the second allowance data derived based on an i-th original value of the restriction data to the authentication target apparatus for verification performed using a corresponding i-th hash value of the first allowance data.

11. The authentication apparatus according to claim 10, wherein in a case where the time measured by the timer circuitry reaches the i-th reference time, the communication circuitry is configured to transmit i values of the second allowance data respectively derived based on first to i-th original values of the restriction data to the authentication target apparatus for verification performed using i corresponding hash values of the first allowance data.

12. The authentication apparatus according to claim 10, wherein the authentication target apparatus stores, in advance, N first authentication keys each used to generate response data from challenge data received together with the authentication request from the authentication apparatus, the communication circuitry is configured to transmit the challenge data together with the authentication request to the authentication target apparatus, and receive the authentication response that is transmitted from the authentication target apparatus in response to the authentication request and includes the response data generated using an i-th first authentication key, and the processing circuitry is configured to perform authentication on the authentication target apparatus by performing verification on the response data included in the authentication response using the challenge data transmitted to the authentication target apparatus and a second authentication key corresponding to the i-th first authentication key.

13. An image-forming apparatus comprising:
an authentication unit configured to perform authentication on an authentication target apparatus that includes pre-stored first allowance data used to determine whether a response to an authentication request received from the authentication unit is allowed; and
an image-forming unit configured to form an image on a sheet,
wherein the authentication unit includes:
   timer circuitry configured to measure a time for which the authentication apparatus is energized;
   a memory storing restriction data that becomes readable after the time measured by the timer circuitry reaches a pre-set reference time;
   communication circuitry configured to transmit, to the authentication target apparatus, second allowance data based on the restriction data read from the memory, the second allowance data being subjected to verification by the authentication target apparatus using the first allowance data; and
   processing circuitry configured to perform authentication on the authentication target apparatus based on an authentication response received from the authentication target apparatus when the verification performed on the second allowance data by the authentication target apparatus with use of the first allowance data is successful,
wherein the authentication target apparatus is an exchangeable component that is mounted to the image-forming apparatus,
wherein the exchangeable component stores a control parameter indicating an operating condition suitable for the exchangeable component, the image-forming apparatus further comprises a control circuit configured to prohibit reading of the control parameter from the exchangeable component in a case where authentication performed on the exchangeable component by the processing circuitry fails, and before the time measured by the timer circuitry reaches the reference time, the control circuit is configured to allow reading of the control parameter from the exchangeable component without causing the processing circuitry to perform authentication on the exchangeable component.

* * * * *